(12) United States Patent
Lainema et al.

(10) Patent No.: US 9,800,893 B2
(45) Date of Patent: Oct. 24, 2017

(54) APPARATUS, A METHOD AND A COMPUTER PROGRAM FOR VIDEO CODING AND DECODING

(71) Applicant: Nokia Technologies Oy, Espoo (FI)

(72) Inventors: Jani Lainema, Tampere (FI); Miska Matias Hannuksela, Tampere (FI); Kemal Ugur, Tampere (FI); Vinod Kumar Malamal Vadakital, Tampere (FI)

(73) Assignee: Nokia Technologies Oy, Espoo (FI)

( * ) Notice: Subject to any disclaimer, the term of this patent is extended or adjusted under 35 U.S.C. 154(b) by 450 days.

(21) Appl. No.: 14/254,120

(22) Filed: Apr. 16, 2014

(65) Prior Publication Data

US 2014/0314148 A1    Oct. 23, 2014

Related U.S. Application Data

(60) Provisional application No. 61/812,883, filed on Apr. 17, 2013.

(51) Int. Cl.
*H04N 19/70* (2014.01)
*H04N 19/58* (2014.01)
*H04N 19/573* (2014.01)
*H04N 19/105* (2014.01)
*H04N 19/157* (2014.01)
*H04N 19/187* (2014.01)
*H04N 19/31* (2014.01)

(52) U.S. Cl.
CPC ......... *H04N 19/573* (2014.11); *H04N 19/105* (2014.11); *H04N 19/157* (2014.11); *H04N 19/187* (2014.11); *H04N 19/31* (2014.11); *H04N 19/58* (2014.11); *H04N 19/70* (2014.11)

(58) Field of Classification Search
CPC .......................................... H04N 19/00–19/99
See application file for complete search history.

(56) References Cited

U.S. PATENT DOCUMENTS

2006/0083298 A1    4/2006  Wang et al.
2006/0245504 A1    11/2006 Ogikubo et al.
(Continued)

FOREIGN PATENT DOCUMENTS

RU           2407217         12/2010
WO       2013/009237 A1      1/2013
(Continued)

OTHER PUBLICATIONS

"Information technology—Coding of audio-visual objects—Part 15: Advanced Video Coding (AVC) file format", ISO/IEC 14496-15, First edition, Apr. 15, 2004, 29 pages.
(Continued)

*Primary Examiner* — William C Vaughn, Jr.
*Assistant Examiner* — Lindsay Uhl
(74) *Attorney, Agent, or Firm* — Alston & Bird LLP

(57) ABSTRACT

A method and related apparatus for decoding an image sequence from a bitstream, wherein an identifier indicating if all output pictures are decodable with a predefined set of reference pictures is decoded; an indication of required reference pictures for a given output picture is decoded; the indicated at least one reference picture for the given output picture is decoded; and the at least one output picture is decoded.

15 Claims, 8 Drawing Sheets

(56) References Cited

U.S. PATENT DOCUMENTS

| | | |
|---|---|---|
| 2012/0013746 A1 | 1/2012 | Chen et al. |
| 2012/0063741 A1 | 3/2012 | Komiya et al. |
| 2012/0121017 A1 | 5/2012 | Chen et al. |
| 2012/0183076 A1 | 7/2012 | Boyce et al. |
| 2013/0077687 A1 | 3/2013 | Wang et al. |
| 2013/0155184 A1* | 6/2013 | Chen .................. H04N 13/0048 348/43 |
| 2014/0079119 A1* | 3/2014 | Samuelsson ........... H04N 19/50 375/240.12 |
| 2014/0092964 A1* | 4/2014 | Ugur ...................... H04N 19/46 375/240.12 |
| 2014/0140406 A1* | 5/2014 | Yu .......................... H04N 19/70 375/240.16 |
| 2014/0198857 A1* | 7/2014 | Deshpande .......... H04N 19/423 375/240.25 |
| 2015/0016505 A1* | 1/2015 | Sjoberg .................. H04N 19/70 375/240.02 |
| 2015/0085939 A1* | 3/2015 | Deshpande .......... H04N 19/517 375/240.26 |
| 2015/0198857 A1* | 7/2015 | Yashiro ................. G02F 1/1525 359/270 |

FOREIGN PATENT DOCUMENTS

| | | |
|---|---|---|
| WO | WO 2013/016611 | 1/2013 |
| WO | 2013/016871 A1 | 2/2013 |

OTHER PUBLICATIONS

"Parameter Values for Ultra-High Definition Television Systems for Production and International Programme Exchange", Recommendation ITU-R BT.2020, Aug. 2012, 7 pages.

"Parameter Values for the HDTV Standards for Production and International Programme Exchange", Recommendation ITU-R BT.709-5, Apr. 2002, 32 pages.

"Information technology—Coding of audio-visual objects—Part 12: ISO base media file format", ISO/IEC 14496-12, Second edition, Apr. 1, 2005, 94 pages.

"Information technology—Coding of audio-visual objects—Part 14: MP4 file format", ISO/IEC 14496-14, First edition, Nov. 15, 2003, 18 pages.

"3rd Generation Partnership Project; Technical Specification Group Services and System Aspects; Transparent end-to-end packet switched streaming service (PSS); 3GPP file format (3GP) (Release 11)", 3GPP TS 26.244, V11.1.0, Sep. 2012, pp. 1-60.

Sjoberg et al., "Overview of HEVC High-Level Syntax and Reference Picture Management", IEEE Transactions on Circuits and Systems for Video Technology, vol. 22, Issue: 12, Dec. 2012, pp. 1858-1870.

International Search Report and Written Opinion received for corresponding Patent Cooperation Treaty Application No. PCT/FI2014/050274, dated Jun. 6, 2014, 14 pages.

ISO/IEC JTC1/SC29/WG11 (MPEG) output document N5540, "Applications and Requirements for Scalable Video Coding", the 64th MPEG meeting, (Mar. 2003) 14 pages.

Office Action for corresponding Australian Application No. 2014255577 dated May 16, 2017, 4 pages.

Office Action for corresponding Russian Application No. 2015146961 dated Feb. 17, 2017.

Office Action for corresponding Canadian Application No. 2,909,566 dated Jan. 3, 2017.

Office action received for corresponding Korean Patent Application No. 2015-7032685, dated Sep. 23, 2016, 4 pages of office action and No pages of Translation available.

Extended European Search Report received for corresponding European Patent Application No. 14785343.6, dated Oct. 10, 2016, 9 pages.

Schierl et al., "Mobile Video Transmission Using Scalable Video Coding", IEEE Transactions on Circuits and Systems for Video Technology, vol. 17, No. 9, Sep. 2007, pp. 1204-1217.

\* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

Video codec consists of an encoder that transforms the images of the input video into a compressed representation suited for storage/transmission and a decoder that can uncompress the compressed video representation back into a viewable form. Image sequences can be compressed either as sequences of still pictures coded with spatial prediction means or inter pictures coded with spatial and temporal prediction means. Image sequences with random access and support for editing individual pictures have been traditionally enabled by representing the sequence as a series of independently coded intra pictures. Such formats include, for example, Motion JPEG, animated GIF and the Intra profiles of H.264.

If a sequence of images is represented as a series of still pictures, the coding efficiency is typically poor and the file size requirement for a high resolution sequence can become massive. In the case a sequence is coded as a video with temporal prediction, there are strict limitations on how the sequence needs to be decoded, how it can be played back and issues when user wants to edit some of the images in the sequence.

Therefore, there is a need for more efficient methods for encoding and decoding image sequences while simultaneously providing random access and editability functionalities.

SUMMARY

This invention proceeds from the consideration that a more efficient encoding/decoding of an image sequence with random access and editability functionalities is achieved by signaling if a reference picture set can be stored in the reference picture buffer once and if all the output pictures in the sequence can be decoded with said set of reference pictures that does not change during the course of decoding the sequence.

A method according to a first embodiment comprises a method for decoding an image sequence from a bitstream, the method comprising decoding an identifier indicating if all output pictures are decodable with a predefined set of reference pictures;

decoding an indication of required reference pictures for a given output picture;

decoding the indicated at least one reference picture for the given output picture; and decoding the at least one output picture.

According to an embodiment, the method further comprises decoding an indication from one or more syntax elements and/or syntax elements values whether a picture is a reference picture or a non-reference picture.

According to an embodiment, the method further comprises decoding an indication that the bitstream comprises only one temporal sub-layer, wherein temporal sub-layer non-reference pictures are regarded as non-reference pictures and all other pictures are regarded as reference pictures.

According to an embodiment, the method further comprises decoding an indication that the bitstream comprises two or more temporal sub-layers, wherein all pictures with TemporalId equal to 0 are considered reference pictures, and all pictures with TemporalId greater than 0 are considered non-reference pictures.

According to an embodiment, the method further comprises decoding metadata from a container file format for the bitstream that indicates reference and non-reference pictures.

According to an embodiment, the method further comprises decoding an indication that indicates output pictures and/or pictures that are not output, the indication being one of the following:

pic_output_flag of HEVC,
a SEI message for indicating pictures to be displayed,
a container file format metadata indication for indicating pictures to be displayed.

According to an embodiment, the container file format is ISO Base Media File Format (ISOBMFF), wherein the output pictures are indicated with a sample grouping mechanism such that a sequence or a set of images is stored using a track structure of ISOMBFF.

According to an embodiment, the method further comprises decoding an indication that all inter coded pictures in a set of pictures use only intra pictures as reference pictures.

According to an embodiment, the method further comprises decoding an indication that all of the inter coded pictures use only one reference picture.

According to an embodiment, the method further comprises decoding an indication regarding zero or more decoding orders which are not identical to a bitstream order from a container file format or from one or more SEI messages.

According to an embodiment, the container file format is ISO Base Media File Format (ISOBMFF), wherein a Chunk Offset box data structure and a Sample to Chunk box data structure are used to associate samples residing in any order within a Media Data box data structure or in external file(s) to the decoding order According to an embodiment, the method further comprises decoding an indication regarding zero or more displaying orders which are not identical to an output order as specified within the bitstream or as indicated to be the default from a container file format or from one or more SEI messages.

A method according to a second embodiment comprises a method for decoding an image sequence from a bitstream, the method comprising decoding an identifier indicating if all inter predicted pictures within the sequence are non-reference pictures;

decoding at least one intra picture; and decoding at least one inter picture.

According to an embodiment, the method further comprises decoding an indication that all of the inter coded pictures use only one reference picture.

A method according to a third embodiment comprises a method for decoding an image sequence from a bitstream, the method comprising decoding an identifier indicating if all enhancement layer pictures use only pictures from base layer pictures;

decoding at least one base layer picture; and decoding at least one enhancement layer picture.

An apparatus according to a fourth embodiment comprises:

at least one processor and at least one memory, said at least one memory stored with code thereon, which when executed by said at least one processor, causes an apparatus to perform at least decoding an identifier from a bitstream, the identifier indicating if all output pictures of an image sequence are decodable with a predefined set of reference pictures;

decoding an indication of required reference pictures for a given output picture;

decoding the indicated at least one reference picture for the given output picture; and decoding the at least one output picture.

According to a fifth embodiment there is provided a computer readable storage medium stored with code thereon for use by an apparatus, which when executed by a processor, causes the apparatus to perform:

decoding an identifier from a bitstream, the identifier indicating if all output pictures of an image sequence are decodable with a predefined set of reference pictures;

decoding an indication of required reference pictures for a given output picture;

decoding the indicated at least one reference picture for the given output picture; and decoding the at least one output picture.

According to a sixth embodiment there is provided an apparatus comprising a video decoder configured for decoding a bitstream comprising an image sequence, the video decoder comprising means for decoding an identifier from the bitstream, the identifier indicating if all output pictures of the image sequence are decodable with a predefined set of reference pictures;

means for decoding an indication of required reference pictures for a given output picture;

means for decoding the indicated at least one reference picture for the given output picture; and means for decoding the at least one output picture.

According to a seventh embodiment there is provided a video decoder configured for decoding a bitstream comprising an image sequence, wherein said video decoder is further configured for:

decoding an identifier from the bitstream, the identifier indicating if all output pictures of the image sequence are decodable with a predefined set of reference pictures;

decoding an indication of required reference pictures for a given output picture;

decoding the indicated at least one reference picture for the given output picture; and decoding the at least one output picture.

A method according to an eighth embodiment comprises a method for encoding an image sequence in a bitstream, the method comprising encoding a set of reference pictures;

storing said set of reference pictures in an initial reference picture buffer;

encoding a set of output pictures without changing the content of the initial reference picture buffer; and encoding an indication in the bitstream indicating that all the output pictures in the image sequence are decodable using said set of reference pictures.

According to an embodiment, the method further comprises encoding an indication in one or more syntax elements and/or syntax elements values whether a picture is a reference picture or a non-reference picture.

According to an embodiment, the method further comprises encoding an indication that the bitstream comprises only one temporal sub-layer, wherein temporal sub-layer non-reference pictures are regarded as non-reference pictures and all other pictures are regarded as reference pictures.

According to an embodiment, the method further comprises encoding an indication that the bitstream comprises two or more temporal sub-layers, wherein all pictures with TemporalId equal to 0 are considered reference pictures, and all pictures with TemporalId greater than 0 are considered non-reference pictures.

According to an embodiment, the method further comprises encoding metadata in a container file for the bitstream that indicates reference and non-reference pictures.

According to an embodiment, the method further comprises encoding an indication that indicates output pictures and/or pictures that are not output, the indication being one of the following:

pic_output_flag of HEVC, a SEI message for indicating pictures to be displayed, a container file format metadata indication for indicating pictures to be displayed.

According to an embodiment, the container file format is ISO Base Media File Format (ISOBMFF), wherein the output pictures are indicated with a sample grouping mechanism such that a sequence or a set of images is stored using a track structure of ISOMBFF.

According to an embodiment, the method further comprises encoding an indication that all inter coded pictures in a set of pictures use only intra pictures as reference pictures.

According to an embodiment, the method further comprises encoding an indication that all of the inter coded pictures use only one reference picture.

According to an embodiment, the method further comprises encoding an indication regarding zero or more decoding orders which are not identical to a bitstream order in a container file format or in one or more SEI messages.

According to an embodiment, the container file format is ISO Base Media File Format (ISOBMFF), wherein a Chunk Offset box data structure and a Sample to Chunk box data structure are used to associate samples residing in any order within a Media Data box data structure or in external file(s) to the decoding order According to an embodiment, the method further comprises encoding an indication regarding zero or more displaying orders which are not identical to an output order as specified within the bitstream or as indicated to be the default in a container file format or in one or more SEI messages.

An apparatus according to a ninth embodiment comprises:

at least one processor and at least one memory, said at least one memory stored with code thereon, which when executed by said at least one processor, causes an apparatus to perform at least encoding a set of reference pictures in a bitstream;

storing said set of reference pictures in an initial reference picture buffer;

encoding a set of output pictures without changing the content of the initial reference picture buffer; and encoding an indication in the bitstream indicating that all the output pictures in the image sequence are decodable using said set of reference pictures.

According to a tenth embodiment there is provided a computer readable storage medium stored with code thereon for use by an apparatus, which when executed by a processor, causes the apparatus to perform:

encoding a set of reference pictures in a bitstream;

storing said set of reference pictures in an initial reference picture buffer;

encoding a set of output pictures without changing the content of the initial reference picture buffer; and encoding an indication in the bitstream indicating that all the output pictures in the image sequence are decodable using said set of reference pictures.

An apparatus according to an eleventh embodiment comprises:

a video encoder configured for encoding an image sequence in a bitstream, wherein said video encoder comprises means for encoding a set of reference pictures;

means for storing said set of reference pictures in an initial reference picture buffer;

means for encoding a set of output pictures without changing the content of the initial reference picture buffer; and means for encoding an indication in the bitstream indicating that all the output pictures in the image sequence are decodable using said set of reference pictures.

According to a twelfth embodiment there is provided a video encoder configured for encoding an image sequence in a bitstream, wherein said video encoder is further configured for encoding a set of reference pictures;

storing said set of reference pictures in an initial reference picture buffer;

encoding a set of output pictures without changing the content of the initial reference picture buffer; and encoding an indication in the bitstream indicating that all the output pictures in the image sequence are decodable using said set of reference pictures.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
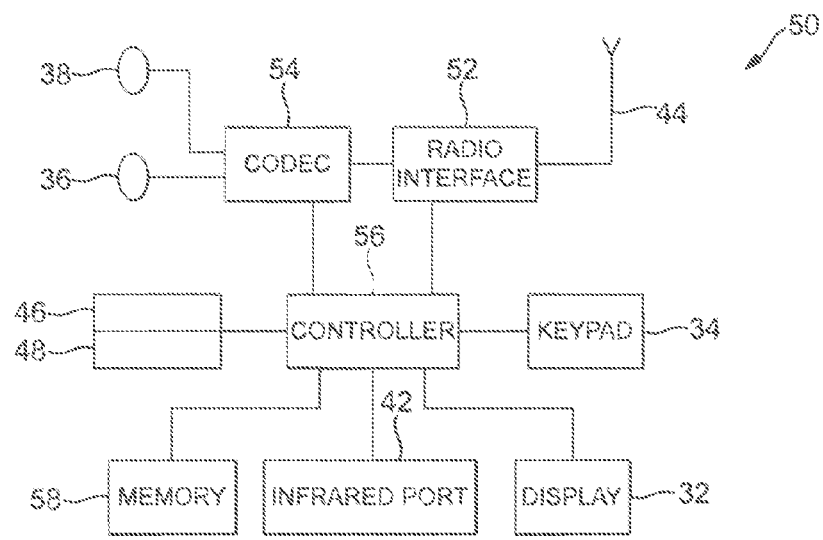
FIG. 1 shows schematically an electronic device employing some embodiments of the invention.
Figure 2:
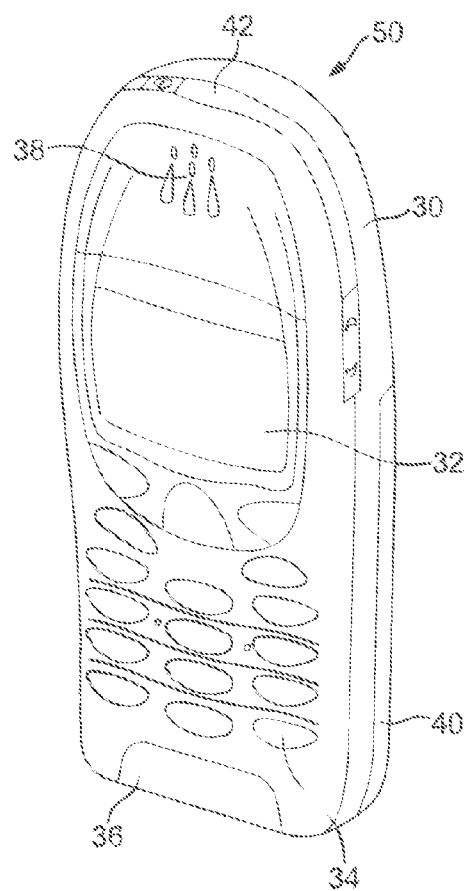
FIG. 2 shows schematically a user equipment suitable for employing some embodiments of the invention.

The following describes in further detail suitable apparatus and possible mechanisms for encoding an enhancement layer sub-picture without significantly sacrificing the coding efficiency. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
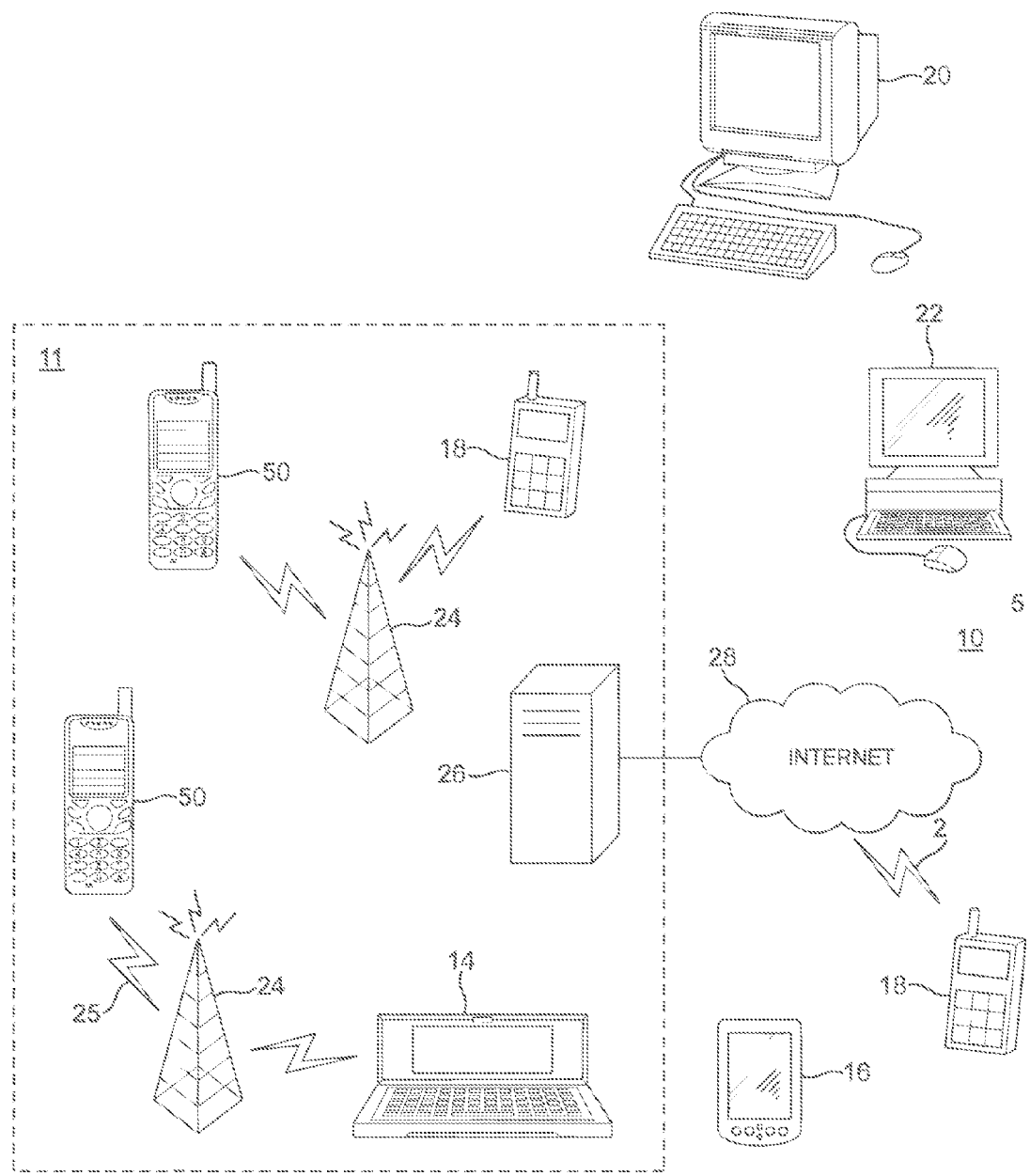
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
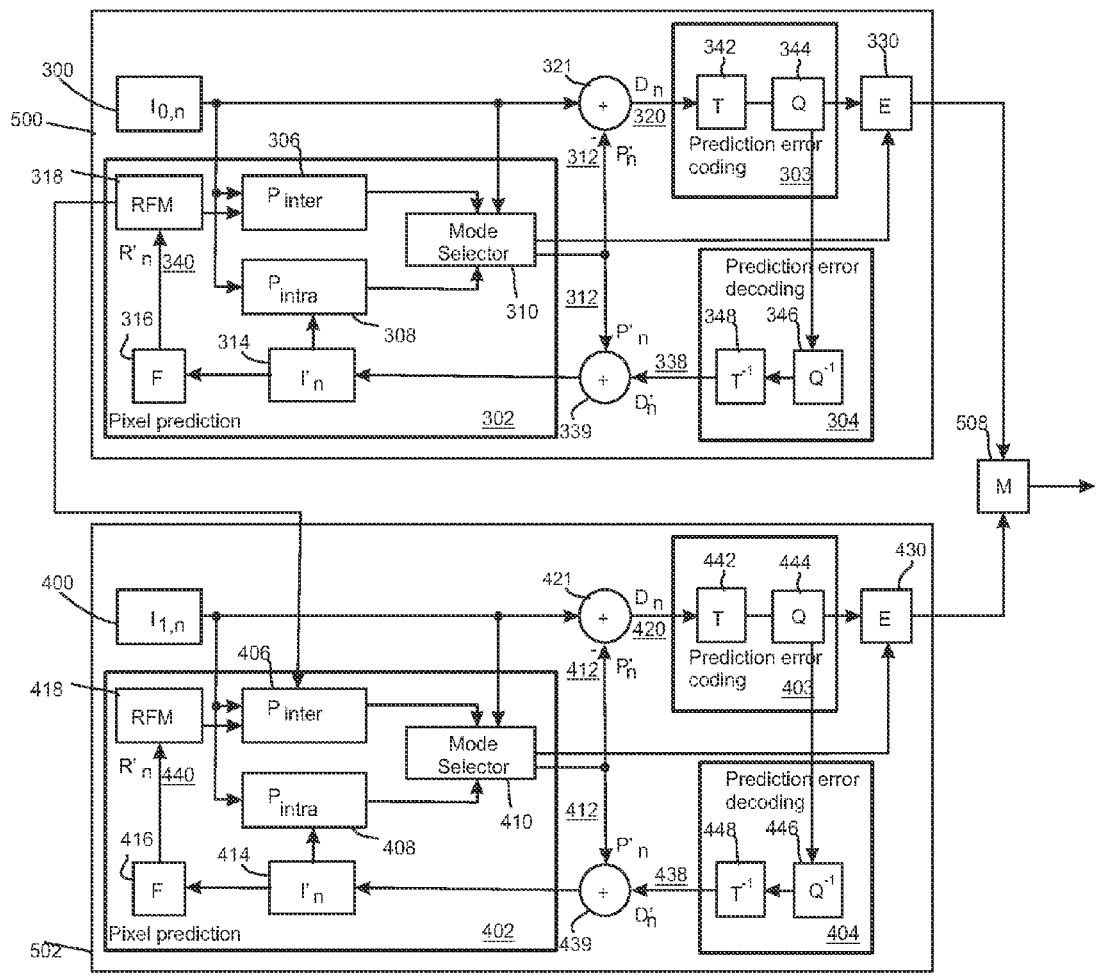
FIG. 4 shows schematically an encoder suitable for implementing some embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

The High Efficiency Video Coding (H.265/HEVC) standard was developed by the Joint Collaborative Team-Video Coding (JCT-VC) of VCEG and MPEG. Currently, the H.265/HEVC standard is undergoing the final approval ballots in ISO/IEC and ITU-T. The standard will be published by both parent standardization organizations, and it is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

The directionality of a prediction mode for intra prediction, i.e. the prediction direction to be applied in a particular prediction mode, may be vertical, horizontal, diagonal. For example, in the current HEVC draft codec, unified intra prediction provides up to 34 directional prediction modes, depending on the size of PUs, and each of the intra prediction modes has a prediction direction assigned to it.

Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

Figure 5:
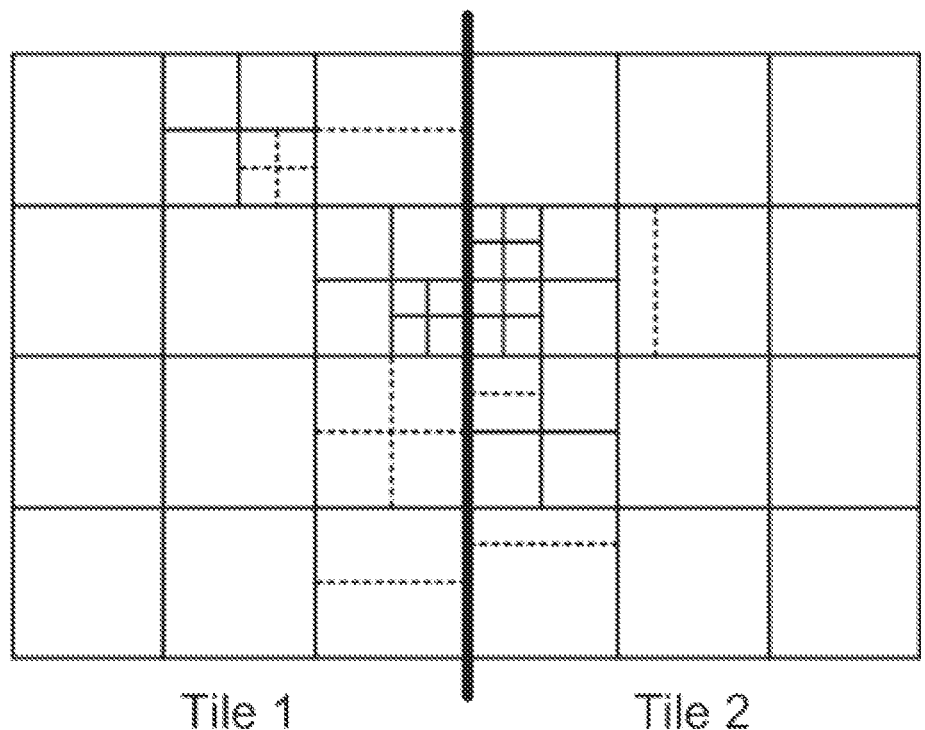
FIG. 5 shows an example of a picture consisting of two tiles.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice is defined to be an integer number of coding tree units contained in one independent slice segment and all subsequent dependent slice segments (if any) that precede the next independent slice segment (if any) within the same access unit. In a draft HEVC standard, a slice segment is defined to be an integer number of coding tree units ordered consecutively in the tile scan and contained in a single NAL unit. The division of each picture into slice segments is a partitioning. In a draft HEVC standard, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In a draft HEVC standard, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 5 shows an example of a picture consisting of two tiles partitioned into square coding units (solid lines) which have been further partitioned into rectangular prediction units (dashed lines).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

In SAO, a picture is divided into regions where a separate SAO decision is made for each region. The SAO information in a region is encapsulated in a SAO parameters adaptation unit (SAO unit) and in HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows:

1. Current sample value is smaller than the two neighbour samples
2. Current sample value is smaller than one of the neighbors and equal to the other neighbor
3. Current sample value is greater than one of the neighbors and equal to the other neighbor
4. Current sample value is greater than two neighbour samples
5. None of the above These five categories are not required to be signalled to the decoder because the classification is based on only reconstructed samples, which may be available and identical in both the encoder and decoder. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The SAO parameters may be signalled as interleaved in CTU data. Above CTU, slice header contains a syntax element specifying whether SAO is used in the slice. If SAO is used, then two additional syntax elements specify whether SAO is applied to Cb and Cr components. For each CTU, there are three options: 1) copying SAO parameters from the left CTU, 2) copying SAO parameters from the above CTU, or 3) signalling new SAO parameters.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

Coded slices can be categorized for example into three classes: raster-scan-order slices, rectangular slices, and flexible slices.

A raster-scan-order-slice is a coded segment that consists of consecutive macroblocks or alike in raster scan order. For example, video packets of MPEG-4 Part 2 and groups of macroblocks (GOBs) starting with a non-empty GOB header in H.263 are examples of raster-scan-order slices.

A rectangular slice is a coded segment that consists of a rectangular area of macroblocks or alike. A rectangular slice may be higher than one macroblock or alike row and narrower than the entire picture width. H.263 includes an optional rectangular slice submode, and H.261 GOBs can also be considered as rectangular slices.

A flexible slice can contain any pre-defined macroblock (or alike) locations. The H.264/AVC codec allows grouping of macroblocks to more than one slice groups. A slice group can contain any macroblock locations, including non-adjacent macroblock locations. A slice in some profiles of H.264/AVC consists of at least one macroblock within a particular slice group in raster scan order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit. In H.264/AVC, the NAL unit header indicates whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In a draft HEVC standard, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit reserved field (called reserved_zero_6bits), which may also be referred to as nuh_layer_id. The temporal_id syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes.

The six-bit reserved field is expected to be used by extensions such as a future scalable and 3D video extension. It is expected that these six bits would carry information on the scalability hierarchy, such as quality_id or similar, dependency_id or similar, any other type of layer identifier, view order index or similar, view identifier, an identifier similar to priority_id of SVC indicating a valid sub-bitstream extraction if all NAL units greater than a specific identifier value are removed from the bitstream. Without loss of generality, in some example embodiments a variable LayerId is derived from the value of reserved_zero_6bits for example as follows: LayerId=reserved_zero_6bits.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
| --- | --- | --- |
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |

| nal_unit_type | Name of nal_unit_type | Content of NAL unit and RBSP syntax structure |
|---|---|---|
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP BLA_N_LP | Coded slice segment of a BLA picture slice_segment_layer_rbsp( ) |
| 19, 20 | IDR_W_DLP IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_RAP_VCL22 ... RSV_RAP_VCL23 | Reserved // reserved RAP VCL NAL unit types |
| 24 ... 31 | RSV_VCL24 ... RSV_VCL31 | Reserved // reserved non-RAP VCL NAL unit types |

In a draft HEVC standard, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in a draft HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In a draft HEVC standard a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In a draft HEVC, there is also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. In another draft HEVC standard, an APS syntax structure only contains ALF parameters. In a draft HEVC standard, an adaptation parameter set RBSP includes parameters that can be referred to by the coded slice NAL units of one or more coded pictures when at least one of sample_adaptive_offset_enabled_flag or adaptive_loop_filter_enabled_flag are equal to 1. In some later drafts of HEVC, the APS syntax structure was removed from the specification text.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain temporal_id values) of a layer representation.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a draft HEVC standard, a slice header additionally contains an APS identifier, although in some later drafts of the HEVC standard the APS identifier was removed from the slice header. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, an access unit may be defined as a set of NAL units that are associated with each other according to a specified classification rule, are consecutive in decoding order, and contain exactly one coded picture. In addition to containing the VCL NAL units of the coded picture, an access unit may also contain non-VCL NAL units. The decoding of an access unit always results in a decoded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In a draft HEVC standard, a coded video sequence is defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, can be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may be considered to start from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In a draft HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices. In some later drafts of the HEVC standard, the combined list was removed.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Figure 6:
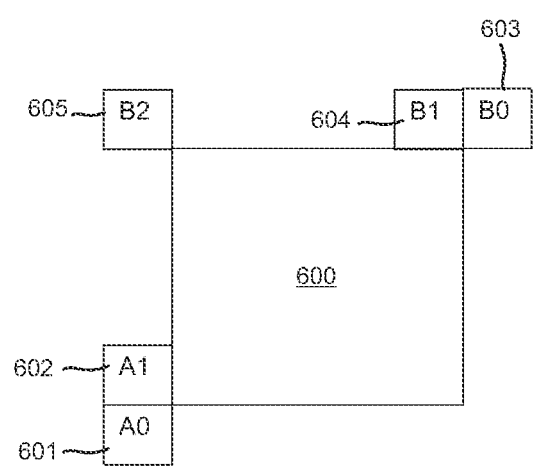
FIG. 6 shows an example of a current block and five spatial neighbors usable as motion prediction candidates.

The advanced motion vector prediction (AMVP) or alike may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions shown in FIG. 6: three spatial motion vector predictor candidate positions 603, 604, 605 located above the current prediction block 600 (B0, B1, B2) and two 601, 602 on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

Many high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU may comprise one or more of the following: 1) The information whether 'the PU is uni-predicted using only reference picture list0' or 'the PU is uni-predicted using only reference picture list1' or 'the PU is bi-predicted using both reference picture list0 and list 1'; 2) Motion vector value corresponding to the reference picture list0, which may comprise a horizontal and vertical motion vector component; 3) Reference picture index in the reference picture list0 and/or an identifier of a reference picture pointed to by the motion vector corresponding to reference picture list0, where the identifier of a reference picture may be for example a picture order count value, a layer identifier value (for inter-layer prediction), or a pair of a picture order count value and a layer identifier value; 4) Information of the reference picture marking of the reference picture, e.g. information whether the reference picture was marked as "used for short-term reference" or "used for long-term reference"; 5)-7) The same as 2)-4), respectively, but for reference picture list 1. Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

One of the candidates in the merge list may be a TMVP candidate, which may be derived from the collocated block within an indicated or inferred reference picture, such as the reference picture indicated for example in the slice header for example using the collocated_ref_idx syntax element or alike.

In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

When the target reference index value has been determined, the motion vector value of the temporal motion vector prediction may be derived as follows: Motion vector at the block that is co-located with the bottom-right neighbor of the current prediction unit is calculated. The picture where the co-located block resides may be e.g. determined according to the signalled reference index in the slice header as described above. The determined motion vector at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the co-located block is a long-term reference picture (while the other is a short-term reference picture), the TMVP candidate may be considered unavailable. If both of the target reference picture and the reference picture of the motion vector of the co-located block are long-term reference pictures, no POC-based motion vector scaling may be applied.

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the 64$^{th}$ MPEG meeting, Mar. 10 to 14, 2003, Pattaya, Thailand.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, block partitioning, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

The scalability structure in the SVC draft may be characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL−1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared with older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVC standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_refactive_1x_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability following scalability modes exist:
  Spatial scalability: Base layer pictures are coded at a higher resolution than enhancement layer pictures.
  Bit-depth scalability: Base layer pictures are coded at lower bit-depth (e.g. 8 bits) than enhancement layer pictures (e.g. 10 or 12 bits).
  Chroma format scalability: Base layer pictures provide lower fidelity in chroma (e.g. coded in 4:2:0 chroma format) than enhancement layer pictures (e.g. 4:4:4 format).
  Color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut.

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame based scalability, approach can be implemented very efficiently with minimal changes to single layer codecs while still achieving majority of the coding efficiency gains available. Essentially a reference frame based scalability codec can be implemented by utilizing the same hardware or software implementation for all the layers, just taking care of the DPB management by external means.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

A scalable video encoder e.g. for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). Currently, two designs to realize scalability are investigated for SHVC. One is reference index based, where an inter-layer reference picture can be included in a one or more reference picture lists of the current picture being coded or decoded (as described above). Another may be referred to as IntraBL or TextureRL, where a specific coding mode, e.g. in CU level, is used for using decoded/reconstructed sample values of a reference layer picture for prediction in an enhancement layer picture. The SHVC development has concentrated on development of spatial and coarse grain quality scalability.

It is possible to use many of the same syntax structures, semantics, and decoding processes for MV-HEVC and reference-index-based SHVC. Furthermore, it is possible to use the same syntax structures, semantics, and decoding processes for depth coding too. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used. SMV-HEVC might not be limited to multiview, spatial, and coarse grain quality scalability but may also support other types of scalability, such as depth-enhanced video.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

In MV-HEVC, SMV-HEVC, and reference index based SHVC solution, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). are constructed as follows. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, such as the RefLayerId[i] variable derived from the VPS extension as described above. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

In the coding and/or decoding process, the inter-layer reference pictures may be treated as a long term reference pictures.

In SMV-HEVC and a reference index based SHVC solution, inter-layer motion parameter prediction may be performed by setting the inter-layer reference picture as the collocated reference picture for TMVP derivation. A motion field mapping process between two layers may be performed for example to avoid block level decoding process modification in TMVP derivation. A motion field mapping could also be performed for multiview coding, but a present draft of MV-HEVC does not include such a process. The use of the motion field mapping feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture. The block size used for the derivation of the motion parameters and/or prediction mode in the upsampled inter-layer reference picture may be for example 16×16. The 16×16 block size is the same as in HEVC TMVP derivation process where compressed motion field of reference picture is used.

A motion field may be considered to comprise motion parameters. A motion parameter may comprise but is not limited to one or more of the following types:

- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction e.g. from a texture picture to a depth picture. The prediction direction may be indicated per reference picture and/or per prediction type and where in some embodiments inter-view and view-synthesis prediction may be jointly considered as one prediction direction;
- an indication of a reference picture type, such as a short-term reference picture and/or a long-term reference picture and/or an inter-layer reference picture (which may be indicated e.g. per reference picture);
- a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
- a horizontal motion vector component (which may be indicated e.g. per prediction block or per reference index or alike);
- a vertical motion vector component (which may be indicated e.g. per prediction block or per reference index or alike);
- one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike).

Term temporal instant or time instant or time entity or time instance may be defined to represent a same capturing time or output time or output order. For example, if a first view component of a first view is captured at the same time as a second view component in a second view, these two view components may be considered to be of the same time instant. An access unit may be defined to contain pictures (or view components) of the same time instant, and hence in this case pictures residing in an access unit may be considered to be of the same time instant. Pictures of the same time instant may be indicated (e.g. by the encoder) using multiple means and may be identified (e.g. by the decoding) using multiple means, such as a picture order count (POC) value or a timestamp (e.g. an output timestamp).

It has been proposed that in scalable video coding with multi-loop (de)coding operation pictures marked as used for reference need not originate from the same access units or the same time instances in all layers. For example, a smaller number of reference pictures may be maintained in an enhancement layer compared to the base layer. In some coding systems and/or arrangements, temporal inter-layer prediction, which may also be referred to as diagonal inter-layer prediction or diagonal prediction, can be used to improve compression efficiency in such coding scenarios.

Methods to realize the reference picture marking, reference picture sets, and reference picture list construction for diagonal inter-layer are presented.

In an example of diagonal prediction sequence-level signaling e.g. in a video parameter set, may be used. A VPS or similar sequence-level syntax structure may indicate dependencies between layers or views. A syntax element may be added for some or all indicated dependency to indicate whether diagonal prediction or conventional "vertical" prediction from a picture of the same access unit or time instance is used. The picture selected as a reference for diagonal prediction may have for example a pre-determined property, such as the first inter-layer or inter-view reference picture (for the layer or view indicated to be a reference for diagonal prediction) in a reference picture list. Alternatively, the encoder may indicate the reference picture for diagonal prediction in the bitstream, for example as a reference index to a reference picture list, and the decoder may decode an indication of the reference picture for diagonal prediction from the bitstream.

In an example of diagonal prediction, an encoder may assign a picture to be a long-term reference picture (e.g. marked as "used for long-term reference") and indicate the assignment in the bitstream. Correspondingly, the decoder may decode the indication from the bitstream and accordingly assign a picture to be a long-term reference picture. The long-term reference picture may be assigned an identifier, which is independent of its layer or view, or an identifier may include or be accompanied with an identifier of the layer or view of the long-term reference picture. The encoder may indicate that this long-term reference picture is or may be used as reference, for example by including its identifier in a reference picture set (which is coded into a bitstream). Correspondingly, the decoder may decode indications from the bitstream that this long-term reference picture is or may be used as reference. Consequently, the encoder and/or the decoder may include this reference picture in one or more initial reference picture lists. The encoder may include reference picture list modification syntax in the bitstream and the decoder may decode reference picture list modification syntax from the bitstream, based on which this long-term picture may reside in one or more final reference picture lists. If no reference picture list modification syntax is encoded and/or decoded, the final reference picture list(s) may be directly based on the initial reference picture list(s), potentially adjusted by indicating the number of reference pictures in the list(s) in the bitstream (by the encoder) and decoding the number of reference pictures in the list(s) from the bitstream (by the decoder).

In an example e.g. related to diagonal prediction, the encoder may determine an inter-layer reference picture set (ILRPS) and indicate it in the bitstream, and the decoder may receive ILRPS related syntax elements from the bitstream and based on them reconstruct the ILRPS. The encoder and decoder may use the ILRPS for example in reference picture list initialization.

In an example, the encoder may determine and indicate multiple ILRPSes for example in a video parameter set. Each of the multiple ILRPSes may have an identifier or an index, which may be included as a syntax element value with other ILRPS related syntax elements into the bitstream or may be concluded for example based on the bitstream order of ILRPSes. An ILRPS used in a particular (component) picture may be indicated for example with a syntax element in the slice header indicating the ILRPS index.

In an example, syntax elements related to identifying a picture in an ILRPS may be coded in a relative manner for example with respect to the current picture referring to the ILRPS. For example, each picture in an ILRPS may be associated with a relative layer_id and a relative picture order count, both relative to the respective values of the current picture.

For example, the encoder may generate specific reference picture set (RPS) syntax structure for inter-layer referencing or a part of another RPS syntax structure dedicated for inter-layer references. For example, the following syntax structure may be used:

| inter_layer_ref_pic_set( idx ) { | Descriptor |
|---|---|
| num_inter_layer_ref_pics | ue(v) |
| for( i = 0; i < num_inter_layer_ref_pics; i++ ) { | |
| delta_layer_id[ i ] | ue(v) |
| delta_poc[ i ] | se(v) |
| } | |
| } | |

The semantics of the presented syntax may be specified as follows: num_inter_layer_ref_pics specifies the number of component pictures that may be used for inter-layer and diagonal inter-layer prediction for the component picture referring to this inter-layer RPS. delta_layer_id[i] specifies the layer_id difference relative to an expected layer_id value expLayerId. In an example, expLayerId may be initially set to the layer_id of the current component picture, while in some other embodiments, expLayerId may be initially set to (the layer_id value of the current component picture)−1. delta_poc[i] specifies the POC value difference relative to an expected POC value expPOC, which may be set to the POC value of the current component picture.

In an example, with reference to the syntax and semantics of inter_layer_ref_pic_set(idx) above, the encoder and/or the decoder and/or the HRD may perform marking of component pictures as follows. For each value of i the following may apply:

The component picture with layer_id equal to expLayerId−delta_layer_id[i] is marked as "used for inter-layer reference" and with POC equal to expPOC+delta_poc[i].

The value of expLayerId may be updated to expLayerId−delta_layer_id[i]−1.

In an example, the reference picture list initialization may include pictures from the ILRPS used for the current component picture into an initial reference picture list. The pictures from the ILRPS may be included in a pre-defined order with respect to other pictures taking part of in the reference picture list initialization process, such as the pictures in RefPicSetStCurrBefore, RefPicSetStCurrAfter and RefPicSetLtCurr. For example, the pictures of the ILRPS may be included after the pictures in RefPicSetStCurrBefore, RefPicSetStCurrAfter and RefPicSetLtCurr into an initial reference picture list. In another example, the pictures of the ILRPS are included after the pictures in RefPicSetStCurrBefore and RefPicSetStCurrAfter but before RefPicSetLtCurr into an initial reference picture list.

In an example, a reference picture indentified by ILRPS related syntax elements (e.g. by the above-presented inter_layer_ref_pic_set syntax structure) may include a picture that is also included in another reference picture set, such as RefPicSetLtCurr, that is valid for the current picture. In such a case, in an example, only one occurrence of a reference picture appearing in multiple reference picture sets valid for the current picture is included in an initial reference picture list. It may be pre-defined from which subset of a reference picture set the picture is included into an initial reference picture list in case of the same reference picture in multiple RPS subsets. For example, it may be pre-defined that in case of the same reference picture in multiple RPS subsets, the occurrence of the reference picture in the inter-layer RPS is omitted from (i.e. not taking part of) the reference picture list initialization. Alternatively, the encoder may decide which RPS subset or which particular occurrence of a reference picture is included in reference picture list initialization and indicate the decision in the bitstream. For example, the encoder may indicate a precedence order of RPS subsets in the case of multiple copies of the same reference picture in more than one RPS subset. The decoder may decode the related indications in the bitstream and perform reference picture list initialization accordingly, only including the reference picture(s) in an initial reference picture list as determined and indicated in the bitstream by the encoder.

In an example, zero or more ILRPSes may be derived from other syntax elements, such as the layer dependency or referencing information included in a video parameter set. In an example, the construction of an inter-layer RPS may use layer dependency or prediction information provided in a sequence level syntax structure as basis. For example, the vps_extension syntax structure presented earlier may be used to construct an initial inter-layer RPS. For example, with reference to the syntax above, an ILRPS with index 0 may be specified to contain the pictures i with POC value equal to PocILRPS[0][i] and nuh_layer_id equal to NuhLayerIdILRPS[0][i] for i in the range of 0 to num_direct_ref_layers[LayerIdInVps[nuh_layer_id]]−1, inclusive, where PocILRPS[0][i] and NuhLayerIdILRPS[0][i] are specified as follows:

```
for( i = 0; i < num_direct_ref_layers[ LayerIdInVps[
nuh_layer_id ] ]; i++ ) {
    PocILRPS[ 0 ] [ i ] = POC value equal to that of the current picture
    NuhLayerIdILRPS[ 0 ][ i ] = ref_layer_id[ LayerIdInVps[
nuh_layer_id of the current picture ] ] [ i ]
}
```

An inter-layer RPS syntax structure may then include information indicating the differences compared to the initial inter-layer RPS, such as a list of layer_id values that are unused for inter-layer reference even if the sequence level information would allow them to be used for inter-layer referencing.

Inter-ILRPS prediction may be used in (de)coding of ILRPSes and related syntax elements. For example, it may be indicated which references included in a first ILRPS, earlier in bitstream order, are included also in a second ILRPS, later in bitstream order, and/or which references are not included in said second ILRPS.

In an example, the one or more indications whether a component picture of the reference layer is used as an inter-layer reference for one or more enhancement layer component pictures and the controls, such as inter-layer RPS, for the reference picture list initialization and/or the reference picture marking status related to inter-layer prediction may be used together by the encoder and/or the decoder and/or the HRD. For example, in an example the encoder may encode an indication indicating if a first component picture may be used as an inter-layer reference for another component picture in the same time instant (or in the same access unit) or if said first component picture is not used as an inter-layer reference for any other component picture of the same time instant. For example, reference picture list initialization may exclude said first component picture if it is indicated not to be used as an inter-layer reference for any other component picture of the same time instant even if it were included in the valid ILRPS.

In an example, ILRPS is not used for marking of reference pictures but is used for reference picture list initialization or other reference picture list processes only.

In an example, the use of diagonal prediction may be inferred from one or more lists of reference pictures (or subsets of reference picture set), such as RefPicSetStCurrBefore and RefPicSetStCurrAfter. In the following, let us mark a list of reference pictures, such as RefPicSetStCurrBefore and RefPicSetStCurrAfter, as SubsetRefPicSet. An i-th picture in SubsetRefPicSet is marked as SubsetRefPicSet[i] and is associated with a POC value PocSubsetRPS[i]. If there is a picture SubsetRefPicSet[missIdx] in the valid RPS for the current picture such that the DPB does not contain a picture with POC value equal to PocSubsetRPS[missIdx] and with nuh_layer_id equal to the nuh_layer_id of the current picture, the decoder and/or the HRD may operate as follows: If there is a picture in the DPB with POC value equal to PocSubsetRPS[missIdx] and with nuh_layer_id equal to nuh_layer_id of a reference layer of the current picture, the decoder and/or the HRD may use that picture in subsequent decoding operations for the current picture, such as in the reference picture list initialization and inter prediction processes. The mentioned picture may be referred to as inferred reference picture for diagonal prediction.

In an example, the encoder may indicate as a part of RPS related syntax or in other syntax structures, such as the slice header, which reference pictures in an RPS subset (e.g. RefPicSetStCurrBefore or RefPicSetStCurrAfter) reside in a different layer than the current picture and hence diagonal prediction may be applied when any of those reference pictures are used. In an example, the encoder may additionally or alternatively indicate as a part of RPS related syntax or in other syntax structures, such as the slice header, which is the reference layer for one or more reference pictures in an RPS subset (e.g. RefPicSetStCurrBefore or RefPicSetStCurrAfter). The indicated reference pictures in a different layer than the current picture may be referred to as indicated reference pictures for diagonal prediction. The decoder may decode the indications from the bitstream and use the reference pictures from the inferred or indicated other layer in decoding processes, such as reference picture list initialization and inter prediction.

If an inferred or indicated reference picture for diagonal prediction has a different spatial resolution and/or chroma sampling than the current picture, resampling of the reference picture for diagonal prediction may be performed (by the encoder and/or the decoder and/or the HRD) and/or resampling of the motion field of the reference picture for diagonal prediction may be performed.

In an example, the indication of a different layer and/or the indication of the layer for a picture in RPS may be inter-RPS-predicted, i.e. the layer-related property or properties may be predicted from one RPS to another. In other embodiments, layer-related property or properties are not predicted from one RPS to another, i.e. do not take part in inter-RPS prediction.

An example syntax of the short_term_ref_pic_set syntax structure with an indication of a reference layer for a picture included in the RPS is provided below. In this example, layer-related properties are not predicted from one RPS to another.

```
short_term_ref_pic_set( idxRps ) {
    if( idxRps != 0 )
        inter_ref_pic_set_prediction_flag
    if( inter_ref_pic_set_prediction_flag ) {
        if( idxRps = = num_short_term_ref_pic_sets )
            delta_idx_minus1
        delta_rps_sign
        abs_delta_rps_minus1
        for( j = 0; j <= NumDeltaPocs[ RIdx ]; j++ ) {
            used_by_curr_pic_flag[ j ]
            if( !used_by_curr_pic_flag[ j ] )
                use_delta_flag[ j ]
            else
                diag_ref_layer_inter_rps_idx_plus1[ j ]
        }
    }
    else {
        num_negative_pics
        num_positive_pics
        for( i = 0; i < num_negative_pics; i++ ) {
            delta_poc_s0_minus1[ i ]
            used_by_curr_pic_s0_flag[ i ]
            if( used_by_curr_pic_s0_flag[ i ] )
                diag_ref_layer_s0_idx_plus1[ i ]
        }
        for( i = 0; i < num_positive_pics; i++ ) {
            delta_poc_s1_minus1[ i ]
            used_by_curr_pic_s1_flag[ i ]
            if( used_by_curr_pic_s1_flag[ i ] )
                diag_ref_layer_s1_idx_plus1[ i ]
        }
    }
}
```

The semantics of some of the syntax elements may be specified as follows. diag_ref_layer_X_idx_plus1[i] (where X is inter_rps, s0 or s1) equal to 0 indicates that the respective reference picture has the same value of nuh_layer_id as that of the current picture (referring to this reference picture set). diag_ref_layer_X_idx_plus1[i] greater than 0 specifies the nuh_layer_id (denoted refNuhLayerId[i]) of the respective reference picture as follows. Let the variable diagRefLayerIdx[i] be equal to diag_ref_layer_X_idx_plus1[i]−1. refNuhLayerId[i] is set equal to ref_layer_id[LayerIdInVps[nuh_layer_id of the current picture]][diagRefLayerIdx[i]].

In an example, the marking of the indicated and inferred reference pictures for diagonal prediction is not changed when decoding the respective reference picture set.

Available media file format standards include ISO base media file format (ISO/IEC 14496-12, which may be abbreviated ISOBMFF), MPEG-4 file format (ISO/IEC 14496-14, also known as the MP4 format), AVC file format (ISO/IEC 14496-15) and 3GPP file format (3GPP TS 26.244, also known as the 3GP format). The SVC and MVC file formats are specified as amendments to the AVC file format. The ISO file format is the base for derivation of all the above mentioned file formats (excluding the ISO file format itself). These file formats (including the ISO file format itself) are generally called the ISO family of file formats.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track box. A track may be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, typically one media track is selected. Samples of a track may be implicitly associated with sample numbers that are incremented by 1 in the indicated decoding order of samples. The first sample in a track may be associated with sample number 1.

An example of a simplified file structure according to the ISO base media file format may be described as follows. The file may include the moov box and the mdat box and the moov box may include one or more tracks that correspond to video and audio, respectively.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, also included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used when recording content to ISO files in order to avoid losing data if a recording application crashes, runs out of memory space, or some other incident occurs. Without movie fragments, data loss may occur because the file format may typically require that all metadata, e.g., the movie box, be written in one contiguous area of the file. Furthermore, when recording a file, there may not be sufficient amount of memory space (e.g., RAM) to buffer a movie box for the size of the storage available, and re-computing the contents of a movie box when the movie is closed may be too slow. Moreover, movie fragments may enable simultaneous recording and playback of a file using a regular ISO file parser. Finally, a smaller duration of initial buffering may be required for progressive downloading, e.g., simultaneous reception and playback of a file, when movie fragments are used and the initial movie box is smaller compared to a file with the same media content but structured without movie fragments.

The movie fragment feature may enable splitting the metadata that conventionally would reside in the movie box into multiple pieces. Each piece may correspond to a certain period of time for a track. In other words, the movie fragment feature may enable interleaving file metadata and media data. Consequently, the size of the movie box may be limited and the use cases mentioned above be realized.

In some examples, the media samples for the movie fragments may reside in an mdat box, as usual, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. Sample groupings are represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These are distinguished by a type field used to indicate the type of grouping.

The sample group boxes (SampleGroupDescription Box and SampleToGroup Box) reside within the sample table (stbl) box, which is enclosed in the media information (minf), media (mdia), and track (trak) boxes (in that order)

within a movie (moov) box. The SampleToGroup box is allowed to reside in a movie fragment. Hence, sample grouping can be done fragment by fragment.

Image sequences can be compressed either as sequences of still pictures coded with spatial prediction means or inter pictures coded with spatial and temporal prediction means. Image sequences with random access and support for editing individual pictures have been traditionally enabled by representing the sequence as a series of independently coded intra pictures. Such formats include, for example, Motion JPEG, animated GIF and the Intra profiles of H.264.

If a sequence of images is represented as a series of still pictures, the coding efficiency is typically poor and the file size requirement for a high resolution sequence can become massive. In the case a sequence is coded as a video with temporal prediction, there are strict limitations on how the sequence needs to be decoded, how it can be played back and issues when user wants to edit some of the images in the sequence.

Therefore it is desired to introduce improved methods for encoding and decoding image sequences efficiently while providing random access and editability functionalities.

Now in order to enhance the coding efficiency, an improved method for encoding image sequences is presented hereinafter.

Figure 7:
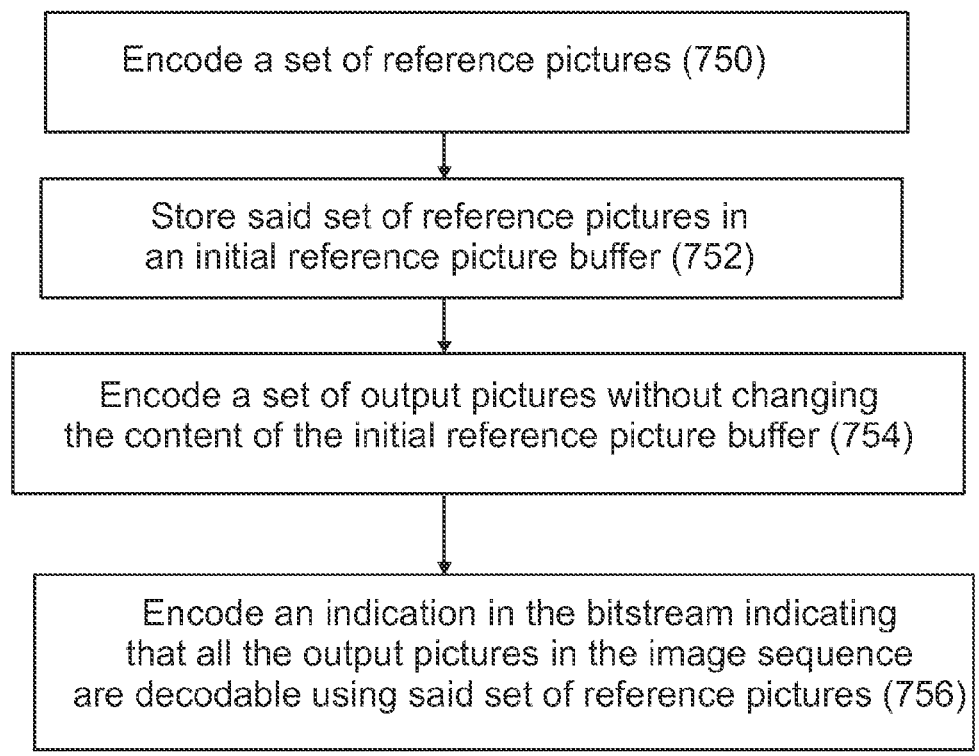
FIG. 7 shows a flow chart of an encoding process according to an embodiment of the invention.

In the method, which is disclosed in FIG. 7, a set of reference pictures is encoded (700) and said set of reference pictures (702) are stored in an initial reference picture buffer. Then a set of output pictures is encoded (704) without changing the content of the initial reference picture buffer, and an indication is encoded (706) in the bitstream indicating that all the output pictures in the sequence can be decoded using the initial set of reference pictures.

In other words, the method enables to limit and indicate the decoding delay characteristics of the prediction structure associated with the image sequence. According to an embodiment, this is performed by signaling if the reference picture set can be stored in the reference picture buffer once and all the output pictures in the sequence can be decoded with this fixed set of reference pictures that does not change during the course of decoding the sequence.

While the actual implementation may be carried out in different ways, one of the basic ideas in different implementations is to indicate the delay and editing capabilities of the image sequence. Some examples of different coding structures are depicted in FIGS. 8*a*-8*d*.

Figure 8A:
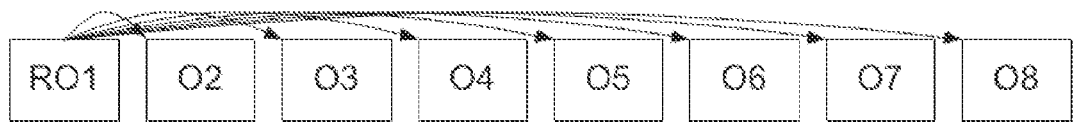
FIGS. 8a-8d show some examples of coding structures according to some embodiments of the invention.

In FIG. 8*a*, there is one reference/output picture RO1, which is a reference picture (R) that all other output pictures O2-O8 use as reference in inter prediction process, and at the same time, an output picture (O1) that the decoder outputs. In the arrangement of FIG. 8*a*, the maximum decoding delay for accessing any of the output pictures O2-O8 in the stream is two picture units; i.e. the delay of one unit for decoding the reference picture RO1 and one unit for decoding the selected output picture O2-O8.

Figure 8B:
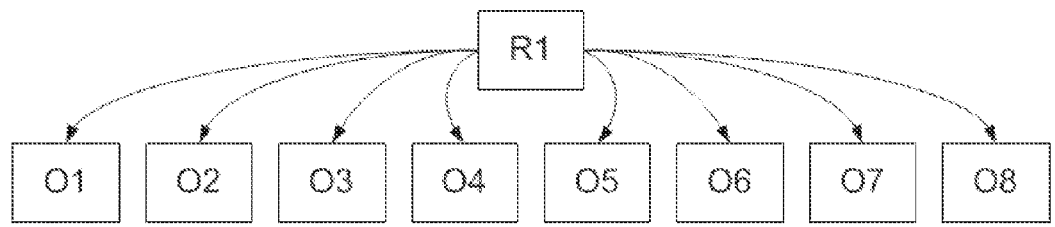

In FIG. 8*b*, all output pictures O1-O8 use the same reference picture R1 as reference in inter prediction process, but here the reference picture R1 is not an output picture. Thus, the coding arrangement of FIG. 8*b* has the same delay characteristics (the maximum decoding delay for any of the output pictures O1-O8 is two picture units) as the coding arrangement of FIG. 8*a*, but in addition the coding arrangement of FIG. 8*b* allows signaling of the possibility of editing any of the output pictures without affecting the compressed representation of the other output pictures, since the only valid reference picture in the sequence (R1) is not an output picture.

Figure 8C:
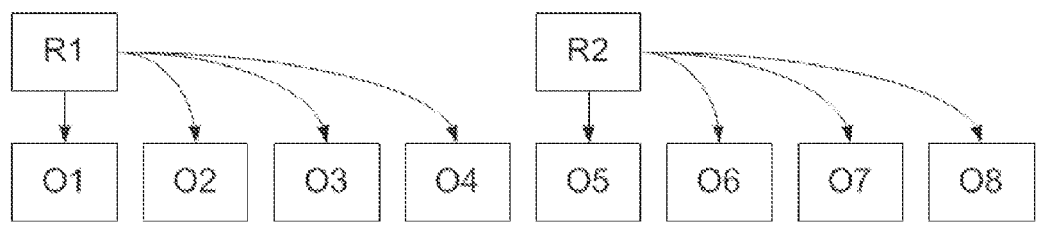

In FIG. 8*c*, two non-output reference pictures R1 and R2 are used as reference in inter prediction process for output pictures O1-O8. The non-output reference picture R1 is used as reference in inter prediction process for the output pictures O1-O4, and the non-output reference picture R2 is used as reference in inter prediction process for the output pictures O5-O8. Again, the maximum decoding delay for accessing any of the output pictures is two picture units (corresponding to decoding of the indicated reference picture and the output picture itself).

Figure 8D:
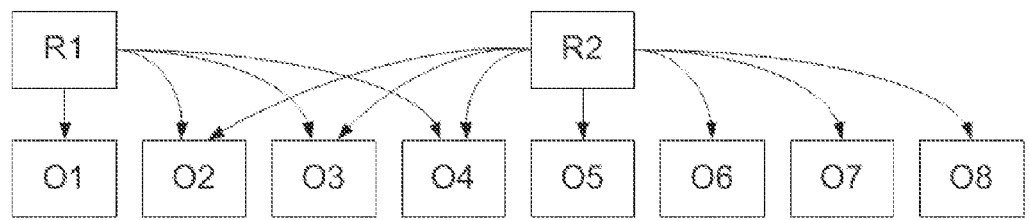

FIG. 8*d* depicts a coding structure, where multiple reference pictures are used for some output pictures. The non-output reference picture R1 is used as reference in inter prediction process for the output pictures O1-O4, and the non-output reference picture R2 is used as reference in inter prediction process for the output pictures O2-O8. As a result, the initial decoding delay for the output pictures O2, O3 and O4 is three picture units as they require two reference pictures R1 and R2 to be decoded prior to decoding any of those output pictures. However, it can be signaled that the decoding delay for any of the output pictures is only one picture unit once the reference pictures have been decoded. This signaling can be beneficial to guide the decoder to occupy its reference picture buffer first and allow the output pictures to be browsed with minimal decoding delay after decoding of the reference pictures.

The method can be implemented in multiple ways. For example, it is apparent that the described processing steps may be performed in different order. Moreover, there may be one or more ways to indicate reference pictures and/or non-reference pictures. There may also be one or more ways to cause the decoding process to treat a picture as a reference picture and/or a non-reference picture.

As an alternative, a similar mechanism may be implemented for a scalable codec, such as scalable extension of HEVC. Such a mechanism may be carried out by coding each one of the individual pictures in the image sequence as a separate layer. Alternatively, pictures used for reference but not for output (e.g. pictures R1 and R2 in FIGS. 8*b*, 8*c* and 8*d*) may reside in a first layer, such as the base layer, and pictures intended for output but not used for reference (e.g. pictures O1 to O8 in FIGS. 8*b*, 8*c* and 8*d*) may reside in a second layer, such as the enhancement layer. Pictures used for reference and output (e.g. picture RO1 in FIG. 8*a*) may, in some embodiments, reside in the first layer, while in other embodiments it may reside in the second layer. The prediction of enhancement layer pictures may be restricted so that enhancement layer pictures utilize pictures only from base layer and not from any other layer during inter-layer prediction process. The prediction of enhancement layer picture may utilize diagonal prediction for example according to any of the examples of diagonal prediction above. The mechanism may involve an additional signaling to indicate the output time of each enhancement layer pictures as those pictures may correspond to pictures taken at different time instants.

According to an embodiment, in some systems such as in H.264/AVC, it may be indicated with one or more syntax elements and/or syntax elements values whether a picture is a reference picture or a non-reference picture.

According to an embodiment, in some systems such as in some embodiments based on HEVC, it may be indicated that there is only one temporal sub-layer (i.e. all pictures have TemporalId equal to 0) and thus temporal sub-layer non-reference pictures (as indicated by the NAL unit type) can be regarded as non-reference pictures and all other pictures can be regarded as reference pictures. The number of temporal sub-layers may be indicated for example in a sequence parameter set (e.g. using the sps_max_sub_layers_minus1 syntax element of HEVC).

According to an embodiment, in some systems such as in some embodiments based on HEVC, it may be indicated that there are two (or more) temporal sub-layers. For example, all pictures with TemporalId equal to 0 may be considered as reference pictures, and all pictures with TemporalId greater than 0 may be considered as non-reference pictures. In some embodiments, all pictures with TemporalId greater than 0 may be indicated to be sub-layer non-reference pictures. In some embodiments, all pictures with TemporalId equal to 0 may be indicated to be of other types than sub-layer non-reference pictures.

According to an embodiment in some systems such as in some embodiments based on HEVC, pictures that are included in a reference picture set may be considered reference pictures and/or pictures not included in a reference picture set may be considered non-reference pictures.

According to an embodiment, in some systems there may be such metadata in a container file for a video bitstream that indicates reference and non-reference pictures. For example, in ISOBMFF (ISO Base Media File Format) and its derivatives (such as ISO/IEC 14496-15 specifying the AVC and HEVC file encapsulation), the Independent and Disposable Samples Box may be used. The field sample_is_depended_on may be used to indicate whether a picture is a reference picture (the field being equal to 1) or a non-reference picture (the field being equal to 2).

According to an embodiment, there may be an indication in a syntax structure, such as in a sequence parameter set, for indicating which way of indicating reference pictures and/or non-reference pictures is in use in the bitstream.

There may be one or more ways to indicate output pictures and/or pictures that are not output, including but not limited to the following:
pic_output_flag of HEVC or alike indication within and along coded pictures,
an SEI message or alike for indicating pictures to be displayed,
file format metadata indication for indicating displaying of a picture.

Especially, if the file format metadata is used in ISOBMFF, the indication may be carried out as provided herein below.

According to an embodiment, output pictures may be indicated with a sample grouping mechanism such that a sequence or a set of images, possibly without timing information, may be stored using the track structure of ISOBMFF. It may be useful for an ISOBMFF parser to know which images (samples) among the given sequence or set are to be presented. The presentation may either be a single image among the sequence or set of images, or a subsequence or a subset of images among the sequence or set of images.

The ISOMBFF provides a sample grouping mechanism that can be used in the embodiment. It enables the sample grouping mechanism in the form of two linked box data structures: (a) the SampleToGroupBox, and (b) the SampleGroupDescriptionBox. The SampleToGroup box represents the assignment of samples to sample groups and a SampleGroupDescription box contains sample group description entries for each sample group describing the properties of the group.

According to an embodiment, if a certain set of images are to be parsed, decoded and presented, a new sample group for this set of samples is defined by extending the ISOMBFF's abstract class VisualSampleGroupEntry. The syntax of this extension is as shown below:

```
class DefaultPictureSamplesGroup( ) extends VisualSampleGroupEntry ('dflt')
{
}
```

The group_description_index of those samples that are to be treated as samples to be displayed then point to DefaultPictureSamplesGroup box. The samples that are not to be displayed are indicated not to be a member of the sample group.

According to an alternative embodiment, output pictures may be indicated with composition times such that a sequence or a set of images, with timing information in the Decoding Time to Sample Box (also referred to as the TimeToSampleBox) and the optional Composition Time to Sample Box (also referred to as the CompositionOffsetBox), may be stored using the track structure of ISOMBFF. In some use cases for timed image sequences, there are some images among the set of images in the image sequence which are required to be decoded but not to be output for display. Currently there is no ISOMBFF method description that handles such a situation.

According to an embodiment, some syntax and semantic elements of ISOMBFF are redefined to support such use cases. ISOMBFF already provides a CompositionOffsetBox to signal the composition time of each sample in a track. By forcing those image samples that are not to be displayed to use an illegal composition offset value, a parser can infer correctly that such samples are not to be displayed.

Every timed image sample that is a part of a track uses the handler type 'vide'. This handler type by default provides all the decoding and presentation timing mechanism required. The TimeToSampleBox provides the decoding time of each sample in the track. Correct setting of values in the TimeToSampleBox will provide the correct decoding time of the image samples as needed.

Additionally, ISOMBFF also provides the CompositionOffsetBox for the appropriate presentation of each sample in the track. To support the use case where an image sample is decoded but not displayed, the CompositionOffsetBox is present in the track. This CompositionOffsetBox uses version 1 of the box. According to an embodiment, the sample_offset value, a 32 bit signed integer, is set to the smallest integer ($-2^{31}$). This is a value that is never realistic in every conceived use cases of image and video presentation. Therefore, when an ISOMBFF parser encounters a sample that provides a realistic decoding time but a composition time that is ($-2^{31}$) shall deem that such a sample is to be decoded but not displayed.

The ISOBMFF also provides the Composition to Decode Box, which contains some syntax elements documenting the relations of decoding times and composition times. Among these syntax elements is leastDecodeToDisplayDelta, which is defined as the smallest composition offset in the CompositionTimeToSample box in this track. According to an embodiment, the value of leastDecodeToDisplayDelta may be set to a greater value than the smallest integer ($-2^{31}$) to indicate that an offset value equal to the smallest integer indeed indicates a picture that is not to be output.

According to an embodiment, instead of or in addition to indicating if all the output pictures can be decoded with a predefined set of reference pictures, the number of reference pictures that need to be decoded prior to being able to decode one or more output pictures may be indicated. This can be done either for a single picture or a number of pictures with one identifier.

According to an embodiment, instead or in addition, the number of reference pictures within a coded video sequence or a bitstream may be indicated.

According to an embodiment, instead or in addition, a number of picture storage buffers that are considered occupied in an operation of the DPB may be indicated for a coded video sequence or a bitstream. This number may be equal to the number of reference pictures. The DPB fullness may be initially (at the start of the decoding operation) considered equal to the number of occupied picture storage buffers. The occupied picture storage buffers may not be emptied or may be emptied only at the start of a coded video sequence and/or a bitstream.

When a reference picture is decoded and it does not already exist in any of the occupied picture storage buffers, it may be included in one of the occupied picture storage buffers that has not yet been taken into use by any other decoded picture. According to an embodiment, even if a reference picture has been output and is no longer needed for reference, the picture storage buffer including the decoded reference picture may not be emptied. It may be required or indicated that a coded video sequence or a bitstream conforms to an indicated profile and/or tier and/or level and/or certain or indicated buffering parameters (e.g. the maximum number picture storage buffers, such as the sps_max_dec_pic_buffering_minus1[i] syntax element of HEVC). In some embodiments, a second set of profile and/or tier and/or level and/or certain or indicated buffering parameters may be provided for a DPB operation using occupied picture storage buffers e.g. as described above, while in some embodiments the same set of profile and/or tier and/or level and/or certain or indicated buffering parameters may be valid for both a conventional DPB operation (without the described use of occupied picture storage buffers or alike) and a DPB operation using occupied picture storage buffers e.g. as described above.

According to an embodiment, instead of or in addition to indicating if all the output pictures can be decoded with a predefined set of reference pictures, it may be indicated that all the inter coded pictures in a set of pictures only use intra pictures as reference pictures.

According to an embodiment, instead of or in addition to indicating if all the output pictures can be decoded with a predefined set of reference pictures, it can be indicated that all the inter coded pictures in a set of pictures only use intra pictures as reference pictures and all of the inter coded pictures only use one reference picture.

Herein, the intra pictures mentioned above may refer to different things, such as an IDR picture or an IRAP picture.

According to an embodiment, it can be indicated that none of the reference pictures used in the decoding process are output pictures or that all the output pictures are non-reference pictures. In this way all the output pictures can be modified without affecting prediction of any of the other output pictures.

According to an embodiment, any of the indications described above may be performed for single pictures separately, jointly for a group of pictures or jointly for all the pictures in the image sequence. Also the form of said signaling may vary. For example, signaling can take place as profile/tier/level indication, other syntax elements, SEI messages or other in-band or out-of-band signaling.

According to an embodiment, the set of reference pictures may be constructed during the course of encoding or decoding the sequence. For example, every $N^{th}$ picture encoded may be used as a reference picture and placed in the reference picture buffer.

According to an embodiment, there may be a further indication on pictures relating to each other and their relationship (e.g. certain pictures may form a focal stack able to recover focus at different distances, while some other pictures may form an exposure stack able to reconstruct a picture with higher dynamic range as the original pictures, also some pictures may be zoomed in representations corresponding to a certain area of another picture, etc.).

According to an embodiment, the position of the reference pictures and/or output pictures in the bitstream may be signaled in order to allow a decoder to occupy the reference picture buffer prior to decoding a requested output picture. This signaling may be carried out in various ways. For example, the position may be signaled as pointers to locations in the bitstream, as NAL unit indexes, through one or more file format metadata mechanisms, such as a sample grouping and/or a timed metadata track of the ISO base media file format or its derivatives, or it may be indicated implicitly or explicitly that all the required reference pictures are clustered in the beginning of the container format.

According to an embodiment, the size in terms of number of bits (or bytes) of the reference pictures and/or output pictures in the bitstream may be signaled in order to allow a decoder to achieve random access within the file.

According to an embodiment, all or some the output pictures may be signaled to be random access points with or without additional signaling indicating the set of reference pictures required to decode one or more of the output pictures.

According to an embodiment, there may be an indication of a restriction that all the output pictures are using same number of bits so that if a picture is edited, the modified picture may be placed in the bitstream buffer without changing the position of other pictures within the file.

According to an embodiment, there may be an indication of a restriction that all the output pictures are placed in the bitstream at equal distance between each other. This can be achieved by placing redundant data between pictures.

According to an embodiment, zero or more decoding orders which are not identical to a bitstream order may be indicated for example in a container file format or in SEI message(s). A decoding order may exclude some pictures of a coded video sequence or a bitstream (defined with the bitstream order or the decoding order according to a coding specification, such as HEVC). A decoding order may include the same coded picture more than once. Two pictures in a decoding order may have an opposite order in another location within the same decoding order and/or may have a different mutual order than they have in the bitstream order or the decoding order according to a coding specification.

Especially, if indicating the decoding order in ISOBMFF, the indication may be carried out as provided herein below.

ISOBMFF enables storage of media data (e.g. video bitstream) in the file that also contains the file metadata (boxes of ISOBMFF) or in one or more separate files. The location of media data is indicated with the Data Reference box. When the media data is stored in the same file as the file metadata, one or more Media Data (mdat) box contains it. A track contains information on the location of the samples (i.e. pictures or access units in case of video bitstream) within the media data in the Chunk Offset box, Sample to Chunk box and Sample Size box. The samples are described within the Sample Table box (e.g. in terms of decoding time) in their decoding order. According to an embodiment, the Chunk Offset box and Sample to Chunk box may be used to associate samples residing in any order within the Media Data box or in external file(s) to the decoding order. Similarly, the same coded picture (sample) may be mapped multiple times to the track using the Chunk Offset box and the Sample to Chunk box.

A same coded reference picture may occur multiple times in a decoding order. As a consequence of decoding the coded reference picture the first time, the decoded reference picture may be included in a picture storage buffer in the DPB. Subsequently, the decoded reference picture may be kept in the picture storage buffer. For a second or later occurrence of the same coded reference picture in the decoding order, a decoder may omit the decoding of the coded reference picture and use the decoded reference picture that had already been stored in the picture storage buffer in subsequent decoding operations.

According to an embodiment, zero or more displaying orders which are not identical to an output order as specified within the bitstream or as indicated to be the default in a container file format may be indicated for example in a container file format or in SEI message(s). A displaying order may exclude some pictures of a coded video sequence or a bitstream. A displaying order may include the same coded picture more than once. Two pictures in a displaying order may have an opposite order in another location within the same displaying order and/or may have a different mutual order than they have in the output.

Especially, if indicating the display order in ISOBMFF, the indication may be carried out as provided herein below.

In some use cases a set of images are required to be presented in many different orders. In such cases there should be a new track created for every unique presentation order of the image sequence. Every such track should contain a CompositionOffsetBox that appropriately records the time when each image sample in the track should be presented.

In some use cases certain images among a set of images may be required to be displayed more than once in the presentation of the image sequence. Currently in ISOMBFF this is only possible if the sample data is replicated. Replication of sample data leads to a larger than needed file size.

When a sample is to be displayed more than once in a presentation, the CompositionOffsetBox must record all presentation offsets for this sample. Currently ISOMBFF defines the sample_count in the CompositionOffsetBox as an integer that counts the number of consecutive samples that have the given offset. In other words, ISOBMFF allows the same picture to have only one composition time (i.e. displayed only once).

According to an embodiment, to overcome the above-mentioned limitations, the syntax of the CompositionOffsetBox need not be modified but the semantics are complemented as follows.

When multiple presentation offsets for a sample are to be recorded, this sample is treated differently than other samples. For such a sample, the number of entries in the CompositionOffsetBox is equal to the number of times it is displayed in the presentation. The first among these entries will set the sample_count to one and the related sample_offset will record the smallest presentation offset of the sample in the presentation time-line. The other additional offsets are recorded by setting the sample_count as zero and then recording the appropriate composition offsets in the related sample_offset field. A parser that encounters an entry in the CompositionOffsetBox with a sample_count equal to one followed by entries of sample_count equal to zero shall interpret the values of the sample_offset as additional offsets of the previous sample.

In other words, the sample_count syntax element, when it is equal to 0, in the present entry within the loop in the CompositionOffsetBox needs to be defined to indicate another composition offset for the last sample for which composition offset was provided in the previous entry within the loop.

According to another embodiment, an Edit List box may be used to specify the same sample to appear in multiple entries (a.k.a. edit segments) within an Edit List box.

It should be noted that any of the indications mentioned above may be specific to a decoding order, to a displaying order, or to a combination of a decoding order and a displaying order. The association of the above-mentioned indications with a certain decoding order, a certain displaying order, and/or a certain combination of a decoding order and a displaying order may be indicated.

Figure 9:
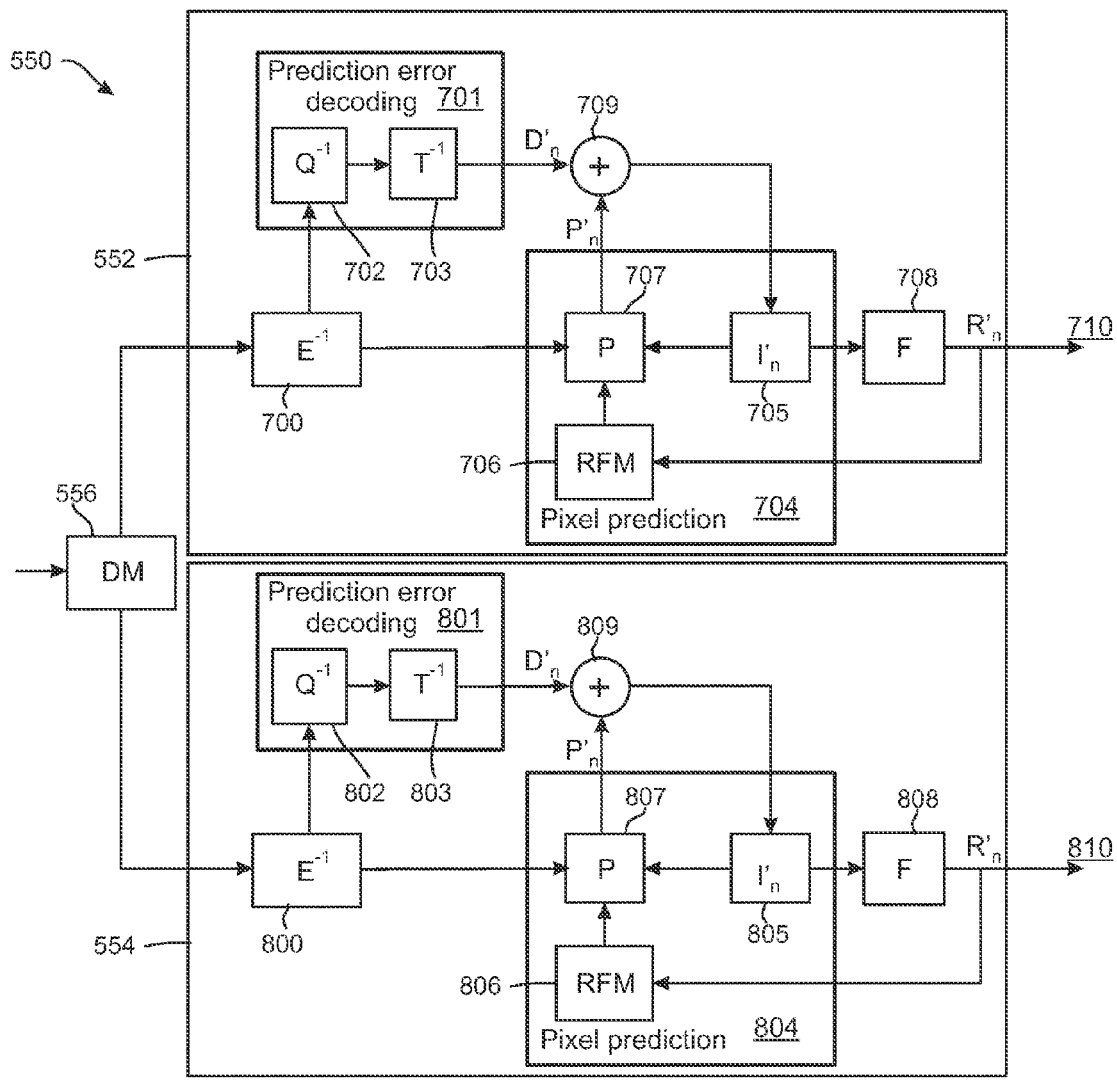
FIG. 9 shows a schematic diagram of a decoder suitable for implementing some embodiments of the invention.

Another aspect of the invention is operation of the decoder when it receives the encoded bitstream. FIG. 9 shows a block diagram of a video decoder suitable for employing embodiments of the invention. FIG. 9 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$'). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Figure 10:
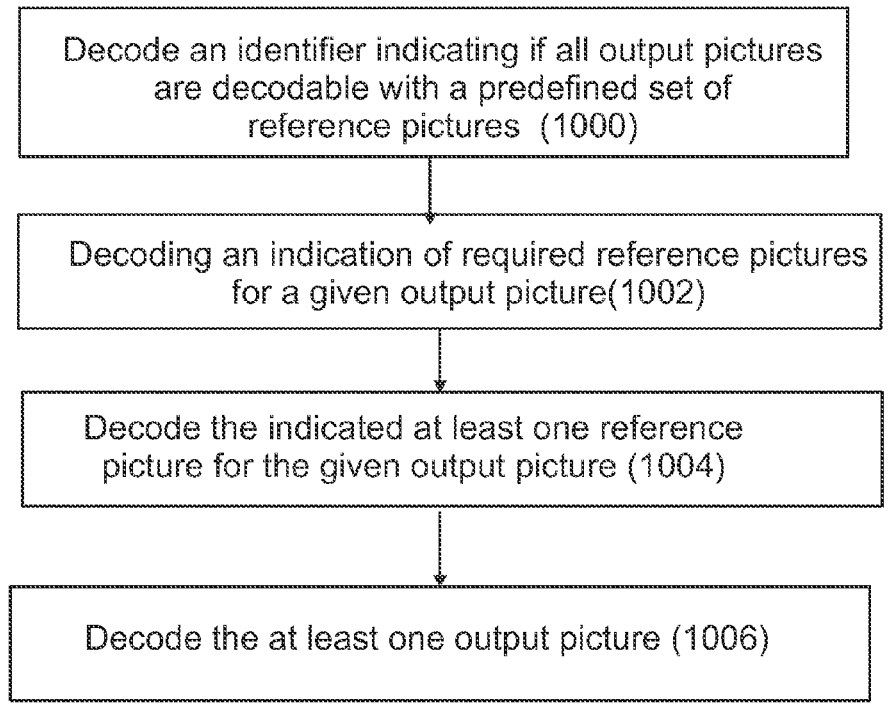
FIG. 10 shows a flow chart of a decoding process according to an embodiment of the invention.

The decoding operations of the embodiments, shown in FIG. 10, are opposite to the encoding operations. Thus, in the decoding process, the decoder may decode (1000) an identifier indicating if all the output pictures can be decoded with a predefined set of reference pictures. The decoder decodes (1002) an indication of required reference pictures for a given output picture. Then, for decoding the given output picture, the decoder decodes (1004) the indicated at least one reference picture, and then decodes (1006) the at least one output picture.

As mentioned above, it is also possible to a coding structure where it is indicated that all the inter coded pictures in a set of pictures only use intra pictures as reference pictures.

Figure 11:
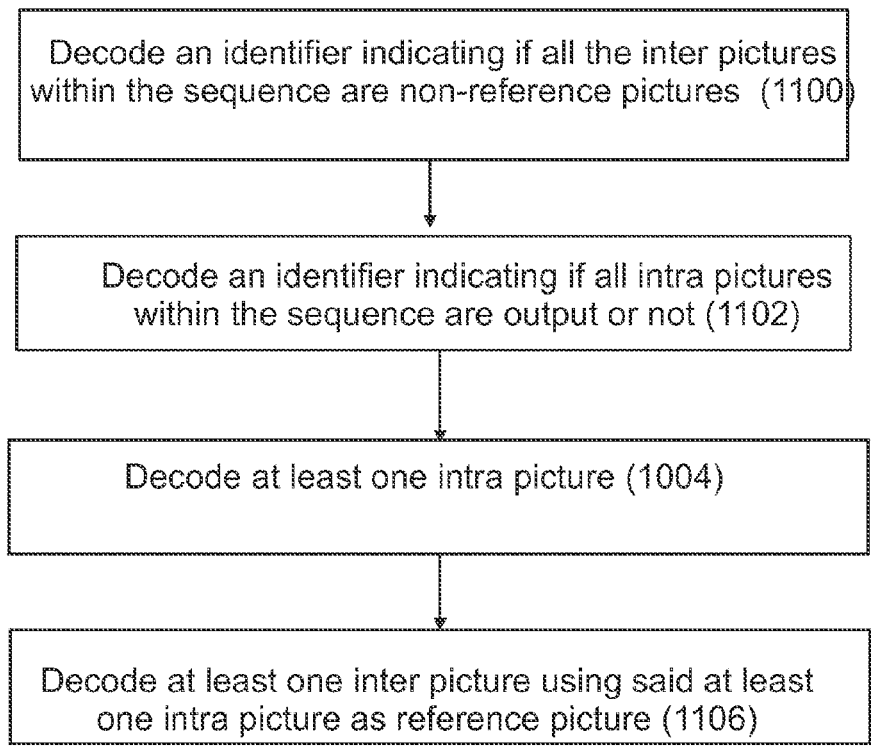
FIG. 11 shows a flow chart of a decoding process according to another embodiment of the invention

In such a case, the decoding process comprises, as shown in FIG. 11, decoding (1100) an identifier indicating if all the inter pictures within the sequence are non-reference pictures. The process may optionally include decoding (1102) an identifier indicating if all intra pictures within the sequence are output or not. Then, for decoding the given output picture, the decoder decodes (1104) at least one intra picture, and then decodes (1106) at least one inter picture using said at least one intra picture as reference picture.

The decoder is further arranged to decode the indications regarding to a decoding order, to a displaying order, or to a combination of a decoding order and a displaying order as described above, and arranged to control the operation of the decoder and the apparatus comprising the decoder to construct the decoded image sequence accordingly.

Thus, the encoding and decoding methods described above provide means for signaling predictive coding structures that allow random access features and a possibility of editing individual pictures in a compressed image sequence while obtaining majority of coding efficiency benefits of inter coding of pictures.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to a first embodiment comprises a method for decoding an image sequence from a bitstream, the method comprising decoding an identifier indicating if all output pictures are decodable with a predefined set of reference pictures;

decoding an indication of required reference pictures for a given output picture;

decoding the indicated at least one reference picture for the given output picture; and decoding the at least one output picture.

According to an embodiment, the method further comprises decoding an indication from one or more syntax elements and/or syntax elements values whether a picture is a reference picture or a non-reference picture.

According to an embodiment, the method further comprises decoding an indication that the bitstream comprises only one temporal sub-layer, wherein temporal sub-layer non-reference pictures are regarded as non-reference pictures and all other pictures are regarded as reference pictures.

According to an embodiment, the method further comprises decoding an indication that the bitstream comprises two or more temporal sub-layers, wherein all pictures with TemporalId equal to 0 are considered reference pictures, and all pictures with TemporalId greater than 0 are considered non-reference pictures.

According to an embodiment, the method further comprises decoding metadata from a container file format for the bitstream that indicates reference and non-reference pictures.

According to an embodiment, the method further comprises decoding an indication that indicates output pictures and/or pictures that are not output, the indication being one of the following:

pic_output_flag of HEVC,
a SEI message for indicating pictures to be displayed,
a container file format metadata indication for indicating pictures to be displayed.

According to an embodiment, the container file format is ISO Base Media File Format (ISOBMFF), wherein the output pictures are indicated with a sample grouping mechanism such that a sequence or a set of images is stored using a track structure of ISOMBFF.

According to an embodiment, the method further comprises decoding an indication that all inter coded pictures in a set of pictures use only intra pictures as reference pictures.

According to an embodiment, the method further comprises decoding an indication that all of the inter coded pictures use only one reference picture.

According to an embodiment, the method further comprises decoding an indication regarding zero or more decoding orders which are not identical to a bitstream order from a container file format or from one or more SEI messages.

According to an embodiment, the container file format is ISO Base Media File Format (ISOBMFF), wherein a Chunk Offset box data structure and a Sample to Chunk box data structure are used to associate samples residing in any order within a Media Data box data structure or in external file(s) to the decoding order According to an embodiment, the method further comprises decoding an indication regarding zero or more displaying orders which are not identical to an output order as specified within the bitstream or as indicated to be the default from a container file format or from one or more SEI messages.

A method according to a second embodiment comprises a method for decoding an image sequence from a bitstream, the method comprising decoding an identifier indicating if all inter predicted pictures within the sequence are non-reference pictures;
decoding at least one intra picture; and
decoding at least one inter picture.

According to an embodiment, the method further comprises decoding an indication that all of the inter coded pictures use only one reference picture.

A method according to a third embodiment comprises a method for decoding an image sequence from a bitstream, the method comprising decoding an identifier indicating if all enhancement layer pictures use only pictures from base layer pictures;
decoding at least one base layer picture; and
decoding at least one enhancement layer picture.

An apparatus according to a fourth embodiment comprises:

at least one processor and at least one memory, said at least one memory stored with code thereon, which when executed by said at least one processor, causes an apparatus to perform at least decoding an identifier from a bitstream, the identifier indicating if all output pictures of an image sequence are decodable with a predefined set of reference pictures;
decoding an indication of required reference pictures for a given output picture;
decoding the indicated at least one reference picture for the given output picture; and
decoding the at least one output picture.

According to a fifth embodiment there is provided a computer readable storage medium stored with code thereon for use by an apparatus, which when executed by a processor, causes the apparatus to perform:

decoding an identifier from a bitstream, the identifier indicating if all output pictures of an image sequence are decodable with a predefined set of reference pictures;
decoding an indication of required reference pictures for a given output picture;
decoding the indicated at least one reference picture for the given output picture; and
decoding the at least one output picture.

According to a sixth embodiment there is provided an apparatus comprising a video decoder configured for decoding a bitstream comprising an image sequence, the video decoder comprising means for decoding an identifier from the bitstream, the identifier indicating if all output pictures of the image sequence are decodable with a predefined set of reference pictures;
means for decoding an indication of required reference pictures for a given output picture;
means for decoding the indicated at least one reference picture for the given output picture; and
means for decoding the at least one output picture.

According to a seventh embodiment there is provided a video decoder configured for decoding a bitstream comprising an image sequence, wherein said video decoder is further configured for:

decoding an identifier from the bitstream, the identifier indicating if all output pictures of the image sequence are decodable with a predefined set of reference pictures;
decoding an indication of required reference pictures for a given output picture;
decoding the indicated at least one reference picture for the given output picture; and
decoding the at least one output picture.

A method according to a eighth embodiment comprises a method for encoding an image sequence in a bitstream, the method comprising encoding a set of reference pictures;
storing said set of reference pictures in an initial reference picture buffer;
encoding a set of output pictures without changing the content of the initial reference picture buffer; and
encoding an indication in the bitstream indicating that all the output pictures in the image sequence are decodable using said set of reference pictures.

According to an embodiment, the method further comprises encoding an indication in one or more syntax elements and/or syntax elements values whether a picture is a reference picture or a non-reference picture.

According to an embodiment, the method further comprises encoding an indication that the bitstream comprises only one temporal sub-layer, wherein temporal sub-layer non-reference pictures are regarded as non-reference pictures and all other pictures are regarded as reference pictures.

According to an embodiment, the method further comprises encoding an indication that the bitstream comprises two or more temporal sub-layers, wherein all pictures with TemporalId equal to 0 are considered reference pictures, and all pictures with TemporalId greater than 0 are considered non-reference pictures.

According to an embodiment, the method further comprises encoding metadata in a container file for the bitstream that indicates reference and non-reference pictures.

According to an embodiment, the method further comprises encoding an indication that indicates output pictures and/or pictures that are not output, the indication being one of the following:
  pic_output_flag of HEVC,
  a SEI message for indicating pictures to be displayed,
  a container file format metadata indication for indicating pictures to be displayed.

According to an embodiment, the container file format is ISO Base Media File Format (ISOBMFF), wherein the output pictures are indicated with a sample grouping mechanism such that a sequence or a set of images is stored using a track structure of ISOMBFF.

According to an embodiment, the method further comprises encoding an indication that all inter coded pictures in a set of pictures use only intra pictures as reference pictures.

According to an embodiment, the method further comprises encoding an indication that all of the inter coded pictures use only one reference picture.

According to an embodiment, the method further comprises encoding an indication regarding zero or more decoding orders which are not identical to a bitstream order in a container file format or in one or more SEI messages.

According to an embodiment, the container file format is ISO Base Media File Format (ISOBMFF), wherein a Chunk Offset box data structure and a Sample to Chunk box data structure are used to associate samples residing in any order within a Media Data box data structure or in external file(s) to the decoding order According to an embodiment, the method further comprises encoding an indication regarding zero or more displaying orders which are not identical to an output order as specified within the bitstream or as indicated to be the default in a container file format or in one or more SEI messages.

An apparatus according to a ninth embodiment comprises:
  at least one processor and at least one memory, said at least one memory stored with code thereon, which when executed by said at least one processor, causes an apparatus to perform at least
  encoding a set of reference pictures in a bitstream;
  storing said set of reference pictures in an initial reference picture buffer;
  encoding a set of output pictures without changing the content of the initial reference picture buffer; and
  encoding an indication in the bitstream indicating that all the output pictures in the image sequence are decodable using said set of reference pictures.

According to an tenth embodiment there is provided a computer readable storage medium stored with code thereon for use by an apparatus, which when executed by a processor, causes the apparatus to perform:
  encoding a set of reference pictures in a bitstream;
  storing said set of reference pictures in an initial reference picture buffer;
  encoding a set of output pictures without changing the content of the initial reference picture buffer; and
  encoding an indication in the bitstream indicating that all the output pictures in the image sequence are decodable using said set of reference pictures.

An apparatus according to an eleventh embodiment comprises:
  a video encoder configured for encoding an image sequence in a bitstream, wherein said video encoder comprises
  means for encoding a set of reference pictures;
  means for storing said set of reference pictures in an initial reference picture buffer;
  means for encoding a set of output pictures without changing the content of the initial reference picture buffer; and
  means for encoding an indication in the bitstream indicating that all the output pictures in the image sequence are decodable using said set of reference pictures.

According to a twelfth embodiment there is provided a video encoder configured for encoding an image sequence in a bitstream, wherein said video encoder is further configured for
  encoding a set of reference pictures;
  storing said set of reference pictures in an initial reference picture buffer;
  encoding a set of output pictures without changing the content of the initial reference picture buffer; and
  encoding an indication in the bitstream indicating that all the output pictures in the image sequence are decodable using said set of reference pictures.

The invention claimed is:

1. A method for decoding an image sequence from a bitstream, the method comprising:
  decoding an identifier indicating that all output pictures from the encoded image sequence are decodable with a predefined set of independently decodable reference pictures, wherein the identifier signals that the predefined set of independently decodable reference pictures can be stored in a reference picture buffer such all the output pictures of the encoded image sequence can be decoded with the predefined set of independently decodable reference pictures, wherein the predefined set of independently decodable reference pictures does not change during the decoding of the encoded image sequence;
  decoding an indication of required independently decodable reference pictures from the predefined set of reference pictures for a given output picture;
  decoding an indication that all inter coded pictures of the encoded image sequence use only intra pictures as reference pictures from the predefined set of independently decodable reference pictures;
  decoding the required independently decodable reference pictures for the given output picture; and
  decoding the at least one output picture.

2. The method according to claim 1, further comprising
  decoding an indication from one or more syntax elements and/or syntax elements values whether a picture is a reference picture or a non-reference picture.

3. The method according to claim 1, further comprising
decoding an indication that the bitstream comprises only one temporal sub-layer, wherein temporal sub-layer non-reference pictures are regarded as non-reference pictures and all other pictures are regarded as reference pictures.

4. The method according to claim 1, further comprising
decoding an indication that the bitstream comprises two or more temporal sub-layers, wherein all pictures with TemporalId equal to 0 are considered reference pictures, and all pictures with TemporalId greater than 0 are considered non-reference pictures.

5. An apparatus comprising:
at least one processor and at least one memory, said at least one memory storing code thereon, which when executed by said at least one processor, causes an apparatus to perform at least
decoding an identifier from a bitstream, the identifier indicating that all output pictures from an encoded image sequence are decodable with a predefined set of independently decodable reference pictures, wherein the identifier signals that the predefined set of independently decodable reference pictures can be stored in a reference picture buffer such that all the output pictures of the encoded image sequence can be decoded with the predefined set of independently decodable reference pictures, wherein the predefined set of independently decodable reference pictures does not change during the decoding of the encoded image sequence;
decoding an indication of required independently decodable reference pictures from the predefined set of independently reference pictures for a given output picture;
decoding an indication that all inter coded pictures of the encoded image sequence use only intra pictures as reference pictures from the predefined set of independently decodable reference pictures;
decoding the required independently decodable reference pictures for the given output picture; and
decoding the at least one output picture.

6. The apparatus according to claim 5, wherein said apparatus is further caused to perform
decoding an indication from one or more syntax elements and/or syntax elements values whether a picture is a reference picture or a non-reference picture.

7. The apparatus according to claim 5, wherein said apparatus is further caused to perform
decoding an indication that the bitstream comprises only one temporal sub-layer, wherein temporal sub-layer non-reference pictures are regarded as non-reference pictures and all other pictures are regarded as reference pictures.

8. The apparatus according to claim 5, wherein said apparatus is further caused to perform
decoding an indication that the bitstream comprises two or more temporal sub-layers, wherein all pictures with TemporalId equal to 0 are considered reference pictures, and all pictures with TemporalId greater than 0 are considered non-reference pictures.

9. A non-transitory computer readable storage medium storing code thereon for use by an apparatus, which when executed by a processor, causes the apparatus to perform:
decoding an identifier from a bitstream, the identifier indicating that all output pictures from an encoded image sequence are decodable with a predefined set of independently decodable reference pictures, wherein the identifier signals that the predefined set of independently decodable reference pictures can be stored in a reference picture buffer such that all the output pictures of the encoded image sequence can be decoded with the predefined set of independently decodable reference pictures, wherein the predefined set of independently decodable reference pictures does not change during the decoding of the encoded image sequence;
decoding an indication of required independently decodable reference pictures from the predefined set of independently reference pictures for a given output picture;
decoding an indication that all inter coded pictures of the encoded image sequence use only intra pictures as reference pictures from the predefined set of independently decodable reference pictures;
decoding the required independently decodable reference pictures for the given output picture; and
decoding the at least one output picture.

10. A method for encoding an image sequence in a bitstream, the method comprising:
encoding a set of independently decodable reference pictures;
storing said set of independently decodable reference pictures in an initial reference picture buffer;
encoding a set of pictures from the image sequence without changing the content of the initial reference picture buffer;
encoding an indication in the bitstream indicating that all the set of encoded pictures from the image sequence are decodable using said set of independently decodable reference pictures, wherein the identifier signals to a decoder that the set of independently decodable reference pictures can be stored in a reference picture buffer such that all the output pictures of the encoded image sequence can be decoded with the set of independently decodable reference pictures, wherein the set of independently decodable reference pictures does not change during the decoding of the encoded image sequence; and
encoding an indication that all inter coded pictures of the encoded image sequence use only intra pictures as reference pictures from the set of independently decodable reference pictures.

11. The method according to claim 10, further comprising
encoding an indication in one or more syntax elements and/or syntax elements values whether a picture is an independently decodable reference picture or a non-reference picture.

12. The method according to claim 10, further comprising
encoding an indication that the bitstream comprises only one temporal sub-layer, wherein temporal sub-layer non-reference pictures are regarded as non-reference pictures and all other pictures are regarded as reference pictures.

13. An apparatus comprising:
at least one processor and at least one memory, said at least one memory stored with code thereon, which when executed by said at least one processor, causes an apparatus to perform at least:
encoding a set of independently decodable reference pictures in a bitstream;
storing said set of independently decodable reference pictures in an initial reference picture buffer;
encoding a set of pictures from an image sequence without changing the content of the initial reference picture buffer;

encoding an indication in the bitstream indicating that all the set of encoded pictures from the image sequence are decodable using said set of independently decodable reference pictures, wherein the identifier signals to a decoder that the set of independently decodable reference pictures can be stored in a reference picture buffer such that all the output pictures of the encoded image sequence can be decoded with the set of independently decodable reference pictures, wherein the set of independently decodable reference pictures does not change during the decoding of the encoded image sequence; and encoding an indication that all inter coded pictures of the encoded image sequence use only intra pictures as reference pictures from the set of independently decodable reference pictures.

14. The apparatus according to claim 13, wherein said apparatus is further caused to perform encoding an indication in one or more syntax elements and/or syntax elements values whether a picture is an independently decodable reference picture or a non-reference picture.

15. A non-transitory computer readable storage medium having code stored thereon for use by an apparatus, which when executed by a processor, causes the apparatus to perform:

encoding a set of independently decodable reference pictures in a bitstream;

storing said set of independently decodable reference pictures in an initial reference picture buffer;

encoding a set of pictures from an image sequence without changing the content of the initial reference picture buffer;

encoding an indication in the bitstream indicating that all the set of pictures from the image sequence are decodable using said set of independently decodable reference pictures, wherein the identifier signals to a decoder that the set of independently decodable reference pictures can be stored in a reference picture buffer such that all the output pictures of the encoded image sequence can be decoded with the set of independently decodable reference pictures, wherein the set of independently decodable reference pictures does not change during the decoding of the encoded image sequence; and encoding an indication that all inter coded pictures of the encoded image sequence use only intra pictures as reference pictures from the set of independently decodable reference pictures.

\* \* \* \* \*